United States Patent [19]

Matherat

[11] 4,266,253

[45] May 5, 1981

[54] PROCESSOR FOR A GRAPHIC TERMINAL

[75] Inventor: Philippe Matherat, Paris, France

[73] Assignee: Thomson-CSF, Paris, France

[21] Appl. No.: 39,279

[22] Filed: May 16, 1979

[30] Foreign Application Priority Data

May 18, 1978 [FR] France ................................ 78 14767

[51] Int. Cl.[3] .......................... H04N 1/00; G09F 9/30

[52] U.S. Cl. .................................... 358/903; 358/257; 340/707; 364/515

[58] Field of Search ............... 358/256, 257, 258, 903; 340/700, 707, 708; 364/515

[56] References Cited

U.S. PATENT DOCUMENTS

| | | | |
|---|---|---|---|
| Re. 29,550 | 2/1978 | Bantner | 358/903 |
| 3,621,214 | 11/1971 | Romney et al. | 358/903 |
| 3,629,844 | 12/1971 | Dancis et al. | 359/903 |
| 4,026,555 | 5/1977 | Kirschmer et al. | 358/903 |
| 4,148,070 | 4/1979 | Taylor | 358/903 |
| 4,161,728 | 7/1979 | Insam | 358/903 |
| 4,177,462 | 12/1979 | Chung | 358/903 |
| 4,189,743 | 12/1979 | Schure et al. | 358/903 |

*Primary Examiner*—Marc E. Bookbinder
*Assistant Examiner*—Edward L. Coles
*Attorney, Agent, or Firm*—Roland Plottel

[57] ABSTRACT

A digital processor for producing and displaying a graphic image on a CRT screen designed for TV frame scanning. It comprises on a single microchip of a semiconductor substrate the following principal elements: a vector generator A, a symbol generator B, a control unit I, a writing pointer and address multiplexers, and the following auxiliary elements: a register for reading a light pen, command registers, control registers and data-storage registers, etc.

15 Claims, 52 Drawing Figures

PROCESSOR FOR A GRAPHIC TERMINAL

BACKGROUND OF THE INVENTION

The invention may be used in information systems using a standard TV set.

This invention relates to the technical field of graphic terminals. More particularly, the invention relates to a processor which, connected to a control unit, enables a graphic image to be displayed on CRT a screen.

Information systems which enable a graphic image composed of geometric figures, alphanumeric characters and various symbols to be displayed on a CRT screen are known in the art as graphic terminals. A graphic terminal comprises in particular a display console generally equipped with a cathode ray tube. Display consoles are divided into two classes according to the method by which the cathode screen is scanned: one of these classes includes consoles equipped with a cathode ray storage tube on the screen of which the data of the image are directly recorded by a so-called "random" scan, whilst the other class includes consoles equipped with a low-persistence cathode ray tube, in whose case the data of the image are stored in a modular memory unit which is read repetitively in cycles at a high rate by a "raster" scan in order to avoid flickering of the image displayed on the cathode ray screen. The present invention relates more particularly, but not exclusively, to this second class of graphic image display consoles known in the art. Various systems designs have already been proposed in the literature; cf. in particular the work of P. MORVAN et al "Images et Ordinateurs", published by Larousse, Paris, 1976.

In addition to the graphic TV console and the memory unit, also known as the "image data storage and refreshment memory", a graphic terminal comprises a control unit for reading the content of the image memory and for synchronizing the television scan of the console, a graphic drawing unit for producing the data of the image and recording them in the memory unit, dialogue tools, such as a keyboard, a photostylus or light pen, a control randle, a rolling ball, a graphic tablet, etc.

For numerous reasons, for example for the local processing of data, for mail order work, for access to data banks, there is a need for interactive graphic consoles selling at a relatively low price. This is because, on the one hand, numerous potential users of information systems already have a standard television receiver or TV set; on the other hand, the unit cost of the memory modules required for forming a modular memory unit is relatively low and, by virtue of their repetitive character, their high unit capacity (number of memory bits per module) and the relatively small number of "input/output" plugs required, these memory modules or packages are readily assembled and interconnected.

So far as the control unit and the graphic unit are concerned, the situation is far different. The construction of these units requires the assembly of a very large number of fairly diverse MSI (medium scale integrated) or SSI (small scale integrated) circuits. The extremely diverse character of the necessary packages and the difficulties involved in assembling and interconnecting them result in a high production cost of these units which virtually prevents graphic consoles from being widely used by the public.

Ideally, it would be necessary to construct the assembly formed by the control unit and the graphic unit in the form of a single package in which the corresponding logic circuits would be integrated on a single microchip of a semi-conductor substrate so as to produce a processor which would be connected between the memory unit and a control unit (microprocessor or computer).

The construction of a processor for a graphic TV console on a single microchip involves several problems. The main problem lies in the need to produce a sufficiently versatile processor, i.e. a processor which affords wide possibilities enabling the various fields of application envisaged to be covered. Another problem is to avoid as far as possible any circuit of the analog type and the use of passive components, such as resistors and capacitors. The technological* to be solved relate in particular to the maximum operating frequency, the number of input/output pins of the package, the number of interconnections, the surface area of the microchip, etc.

*problems

SUMMARY OF THE INVENTION

Accordingly, the present invention relates to a digital processor intended for an interactive graphic terminal which comprises, in particular, a control unit, dialogue tools, a TV set and a modular memory unit addressable for reading and writing; this processor enabling the data of the image to be produced in the form of discrete dots and stored in the memory unit and the content of this memory to be displayed repetitively on the CRT screen of the TV set. According to the invention, the constituent circuits of the processor are integrated by MOS (metal-oxide-semi-conductor) technology on a single microchip of a semi-conductor substrate. The processor comprises:

means for connection to the command unit comprising
- a two-way data bus, its input/output means and its connecting terminals, a one-way data bus and its connecting terminals and control connections;

means for producing and displaying the image data comprising:
- a control unit for producing complex signals for synchronizing the scanning of the cathode screen of the TV set, for producing internal timing signals and for supplying reading address signals for the memory unit; this control unit being controlled by an external clock circuit;
- a graphic unit for producing the image data and storing them in the memory unit; this graphic unit being connected to the internal buses;
- a multiplexer for multiplexing the writing and reading addresses in the memory unit of which the output signals are delivered to a multiplexer for the high and low parts of these addresses;
- an addressable writing pointer which is incremented/decremented by the graphic unit;

auxiliary means comprising:
- a reading register connected to the reading addresses for reading the address of a dot of the screen designated by a dialogue tool;
- registers for storing the data words supplied by the control unit;
- circuits for synchronizing the control signals which enable the control unit to operate asynchronously;
- interruption means.

According to a more specific aspect, the graphic drawing unit or, more precisely, the graphic unit comprises two generators, namely a symbol generator and a vector generator.

According to a general aspect of the invention, the internal organization of the processor is such that it enables the processor to be used either completely or in part, for example as a TV synchronizing generator, a character generator, a vector generator, etc. This organization also provides for modes of use different from that described in detail in applications to display consoles equipped with a cathode ray tube having an intrinsic memory, to X·Y plotters, etc.

According to another aspect, the processor enables different definitions (number of dots per image) of the displayed graphic image to be selected.

According to another aspect, the processor provides for operation according to two TV formats, namely an interlaced frame format and a non-interlaced frame format.

According to another aspect, the processor provides means for refreshing a memory unit composed of memory modules of the dynamic type.

According to another aspect, the size of the characters may be modified by two independent scale factors P and Q.

Other features and advantages afforded by the invention will become apparent from the following description in conjunction with the accompanying drawings which illustrate by way of non-limitng example one embodiment of a digital processor for a graphic console. In these drawings:

DESCRIPTION OF THE PREFERRED EMBODIMENTS

In the following description, certain details relating in particular to the structure of the MOS (metal-oxide-semi-conductor) components will not be described because they are known in the art and would overload and obscure the novel features of the invention. It will also be uderstood that numerous details have been included in the description in order to explain the novel features of the invention and that they are not specifically necessary for carrying out the invention.

The following description is based on an application in which the processor is installed between a standard TV set and an 8-bit microprocessor, although it should be understood that, providing the value of the parameters is adapted accordingly, the invention is applicable to a graphic terminal equipped with a TV monitor and a control unit operating with words of different format.

Figure 1:
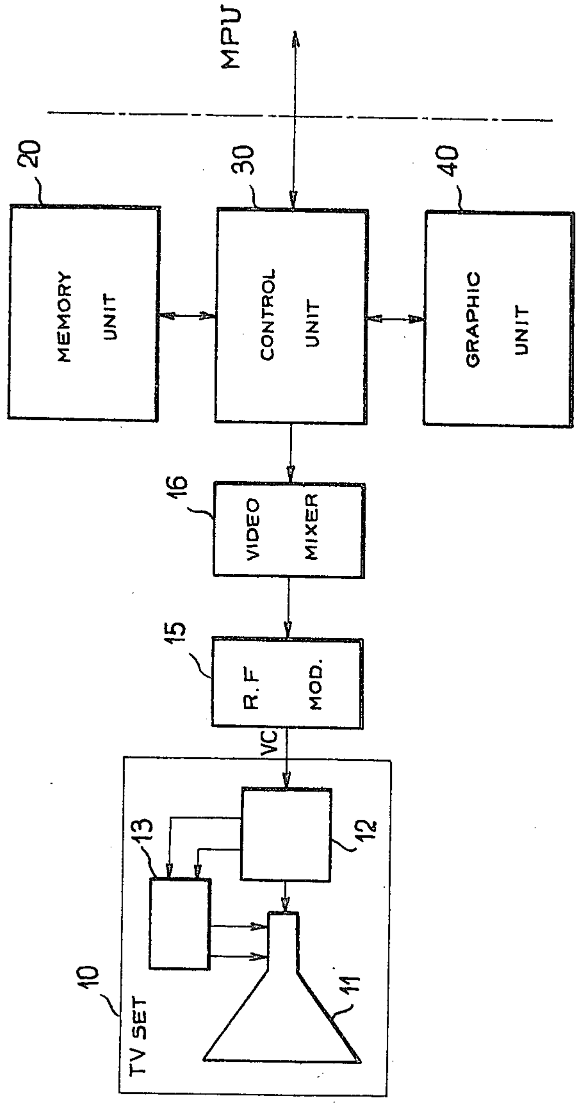
FIG. 1 shows in a modular form the principal elements involved in the construction of a graphic console.

FIG. 1 shows in a modular form the principal constituent elements of a graphic terminal of the TV type. This terminal, which has to be connected to a command unit such as an MPU (microprocessor), comprises in particular:

a TV set 10, such as a standard television receiver, which operates according to a predetermined image standard, for example 625 F; this TV set comprises a cathode ray tube 11 of the monochrome or colour type; an amplifier/demodulator 12 which delivers on the one hand a video signal to the cathode ray tube and, on the other hand, through pulse separators line and frame synchronizing pulses to a circuit 13 which produces the signals for deflecting the electron beam scanning the cathode CRT screen; at its input, this TV set receives a composite video signal VC, optionally modulated by a radiofrequency carrier wave;

a radiofrequency (RF) modulator 15, which is an optional element if the TV set is equipped with a direct video input;

a video mixer 16 which is an optional element if the TV set 10 is a TV monitor equipped with separate SYNC and VIDEO inputs;

a modular memory unit 20 composed of memory modules (packages) of the RAM (random access memory) type which may advantageously be of the dynamic memory type; the image data to be displayed may be recorded or erased and read by addressing the column and lines of the image memory and by controlling the control inputs thereof;

a control unit 30 which produces signals SYNC for synchronizing the scanning of the TV set, reading address signals for the memory unit and luminance signals associated with the screen of the cathode ray tube, and which also controls the exchanges of the signals between the units;

a graphic drawing unit 40 for drawing various symbols, such as alphanumeric characters and various signs and vectors of predetermined length and direction;

dialogue tools (not shown), such as a light pen, a keyboard, a rolling ball, a graphic tablet, etc.

Figure 2:
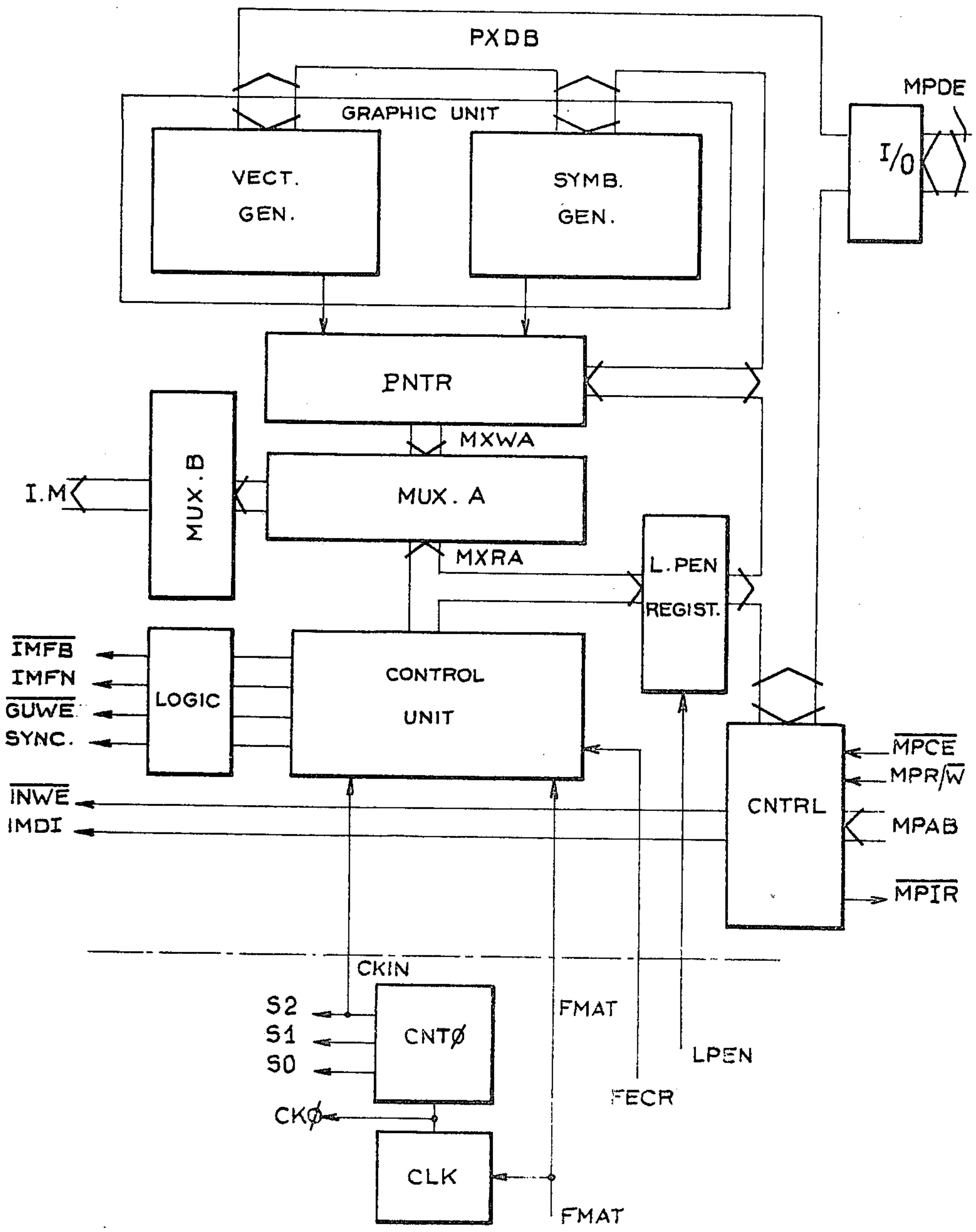
FIG. 2 is a block diagram showing the architecture of a processor according to the invention.

FIG. 2 is a highly simplified block diagram showing the general organization of a processor according to the invention and the inputs/outputs of the module inside which this processor is arranged.

The processor comprises the following elements:

a control unit (CU) controlled by a clock signal CKIN and comprising means which enable it to operate according to two display modes, namely an interlaced TV frame format mode and a paired TV frame format mode; these modes are specified by the level of an input signal FMAT; this control unit supplies: the reading address signals for the image memory, the signal SYNC for synchronizing the TV scan, the luminance control signals $\overline{IMFB}$ and IMFN, a signal GUWE which authorizes the operation of the graphic unit (CU) and which may be forced to the high level by an external signal FECR for forcing to the writing mode;

a graphic unit (GU) which operates in synchronism with the control unit under the control of the clock signal CKIN and which is activated by the signal GUWE; this unit comprises two generators, namely a symbol generator and a vector generator;

a writing pointer PNTR for addressing the image memory in the reading mode and comprising two registers, namely an X register and a Y register; the content of these registers may be modified on the one hand by the internal data bus PXDB and, on the other hand, by incrementation/decrementation signals supplied by the graphic unit;

a multiplexer MUX.A for multiplexing the address signals produced on the one hand by the control unit CU and, on the other hand, by the writing pointer PNTR;

a multiplexer MUX·B for multiplexing the upper and lower parts of the addressing signals of the image memory IM at the rate of the signal CKIN;

a light pen reading register L.PEN REGIST for recording the display address;

a control circuit CNTRL controlling the graphic unit which enables the address word available on the address bus MPAB and the instruction words available on the internal two-way data bus PXDB to be decoded;

logic means LOGIC for generating control signals and synchronizing signals (SYNC) for the TV set;

input/output means (I/O) of the two-way data bus MPDB connected to the command unit MPU.

External means formed by a clock CLK and a counter CNTϕ for producing the clock signal CKIN of the processor; the output signal of the clock has the reference CKϕ whilst the outputs of the counter CNTϕ, which may be a modulo 8 counter, have the references S0, S1 AND S2.

Figure 3A:
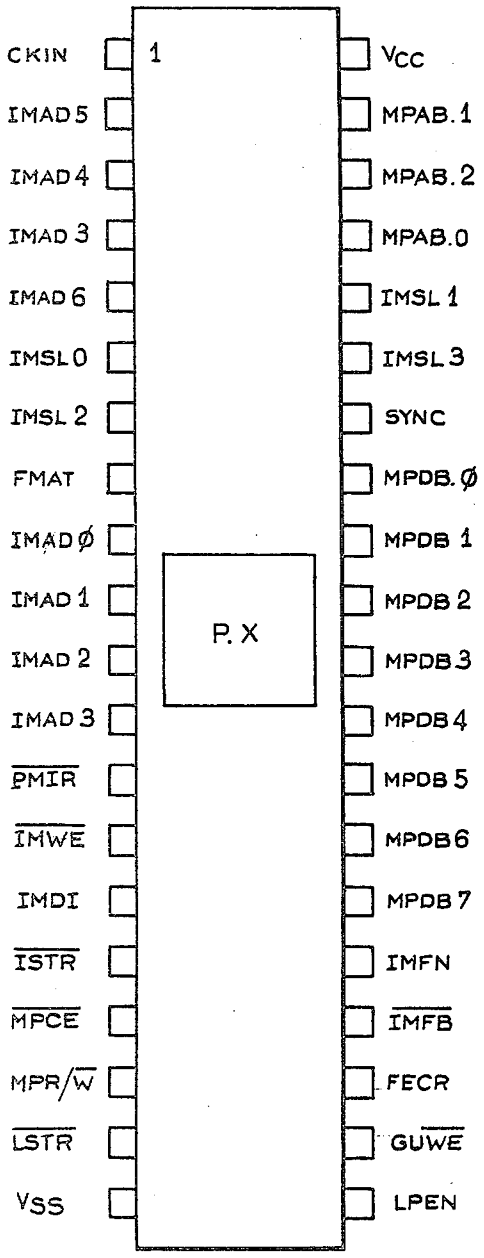
FIGS. 3*a* and 3*b* show the pin configuration of the module and the functional connections of the processor.

FIG. 3*a* shows by way of illustration the pin configuration of the package containing the processor PX which is a standard 40-pin DIL module.

Figure 3B:
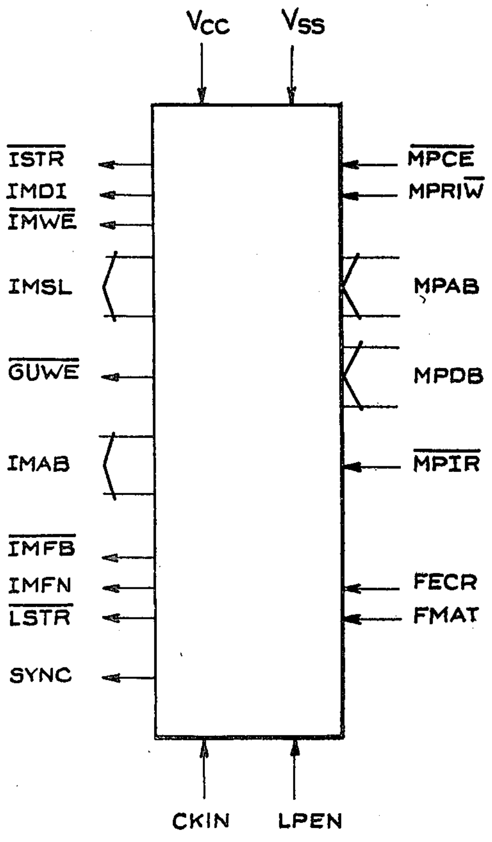

FIG. 3*b* shows the inputs/outputs of the module in a symbolic form; the functions of the pins of the processor are explained in the following:

| Name of the signal | I/O | Function |
|---|---|---|
| | | Description of the pins |
| $V_{SS}$ | I/O | Ground terminal |
| $V_{CC}$ | I | Positive feed source (5 volts) |
| CKIN | I | Clock signal of the processor. All the counters and internal registers are modified by a falling edge. If this signal is at the lower level, the upper part of the addresses of the image memory is present on the bus IMAB and vice versa. The frequency of the signal CKIN depends on the level of the signal FMAT. |
| FMAT | I | TV format. It has to be connected to $V_{CC}$ for an interlaced frame format and to $V_{SS}$ for a paired frame format. This input signal modifies the signal SYNC, the distribution of the addresses on the bus IMAB and the function of the signals IMSL. |
| FECR | I | Signal for forcing the processor to the writing mode; if it is at the high level, the image memory is no longer refreshed in this case and all the clock periods CKIN may be writing periods. |
| SYNC | O | Signal for synchronizing the TV scan; its characteristics depend on the level of the signal FMAT; if FMAT is at the high level ($V_{CC}$), it enables the interlaced 625-line TV frames to be synchronized, if FMAT is at the lower level ($V_{SS}$) it enables the paired 312-line frames to be synchronized. |
| | | Control signal of the image memory IM |
| IMAB (0-6) | O | 7-Bit, address bus of the address memory (low part and high part of the addresses multiplexed at the rate of the clock signal CKIN). |
| IMSL (0-3) | O | Signal for selecting the modules of the image memory. 1. If FMAT is at the lower level, the signals IMSL directly carry the signals $\overline{RAS}$ for using packages (16 pins), 16 K × 1 bit or 4 K × 1 bit. 2. If FMAT is at the high level |

-continued

| Name of the signal | | Function |
|---|---|---|
| | | (512 × 512 dots), the signals IMSL carry the 4-bit coded number of the selected module; the common selection of 8 modules for reading and refreshing should be ensured by the combination of the signals $\overline{GUWE}$ and IMSL 3. |
| $\overline{GUWE}$ | O | Signal at the low level in the reading mode and refreshment period of the image memory. |
| IMDI | O | Signal (active, at the high level) for forcing to the "out" state of the input pin Din of the image memory modules |
| $\overline{IMWE}$ | O | Signal (active at the lower level) for validating a writing operation by the pins $\overline{WE}$ of the image memory modules. |
| $\overline{ISTR}$ | O | Counter part signal of the signal $\overline{MPCE}$ |
| $\overline{IMFB}$ | O | Signal for forcing to the "white" level; enables the video output signal of the memory to be forced to the "white" level; case of the test line LT1 and use of the light pen.. |
| IMFN | O | Signal for forcing to the "black" level, signal (active at the high level) for inhibiting the video output signal of the image memory outside the space corresponding to the graphic image. |
| $\overline{LSTR}$ | O | Signal which at its low level enables the output of the image memory to be recorded, results from the delivery of the instruction word H'OF'. |
| | | Signals for dialogue with the microprocessor MPU |
| MPDB (0-7) | E/S | Two-way data bus; if the signal $\overline{MPCE}$ is at the high level, the outputs are in the high impedence state. |
| MPAB (0-3) | I | Address bus enables the registers to be selected for reading or writing one of the registers. |
| MPR/$\overline{W}$ | I | This signal at the low level enables the data of the bus MPDB to be recorded in an addressed register for the duration of the rear edge of a signal $\overline{MPCE}$; at the high level, it enables the content of an addressed register to be transferred to the bus MPDB. |
| $\overline{MPCE}$ | I | Temporal exchange signal active at the low level. |
| $\overline{MPIR}$ | O | Interruption request signal, output by open collector. |
| | | Light pen |
| LPEN | I | Release signal supplied by the light pen active on the rising edge. |

Instruction and address words

In order to facilitate the description of the invention, a processor operating with words of one octet will be considered. Table 1 shows by way of illustration the possible distribution of the various instruction words:

the codes H'20' to H7E' specify the nature of the symbol to be displayed;

the codes H'80' to H'FF' specify the nature of the short vectors (VECT·S) to be drawn;

the codes H'10' to H'17' specify the "long" vectors (VECT) of any direction;

the codes H'18' to H'1F' specify the "long" vectors of preferential direction (VECT·PRV);

the codes H'00' to H'0F' specify the nature of the instructions which determine the operation of the processor, these instructions being set out in Table 2.

The 4-bit code words which form the address signals of the various registers are set out in Table 3.

Control unit

The control unit enables the scanning circuit of the TV set to be synchronized, the luminance of the CRT screen to be controlled, the image memory to be addressed in the reading mode and control signals to be supplied to the graphic unit. This control unit enables two formats of the TV image to be generated, namely an interlaced frame format and a paired frame format.

Figure 4:
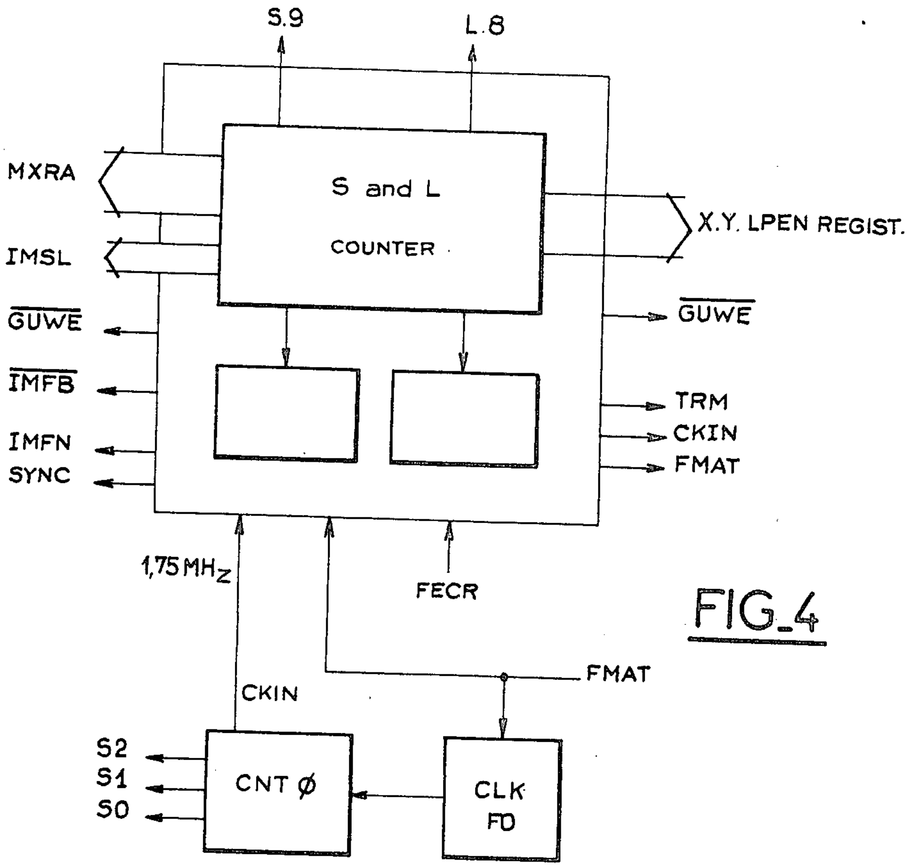
FIG. 4 shows the constituent means of the control unit in the form of a functional block diagram.

FIG. 4 shows the organization of the control unit in a modular form. This unit is controlled by a clock CLK which may advantageously be a quartz oscillator of the electronically tunable type.

The output frequency Fo of this clock CLK is given by the following relation:

$$Fo = FT \cdot NL \cdot Np \cdot KL$$

where, in the example of application selected,

FT is the frame frequency = 50 Hz,

NL is the number of TV lines/frames = 312.5 in the interlaced frame format and 312 in the paired frame format, Np is the number of dots of the graphic image per line = 512 for the upper definition;

KL is the ratio of the number of dots in a TV line to the number $\alpha$ of dots in a line of the graphic image = 7/4, whence Fo = 14 MHz and the number of dots NpKL in a TV line = 896.

The operating frequency of the clock CLK is too high for the circuits corresponding to this clock to be integrated by MOS technology on the microchip of the processor. Accordingly, it is necessary to arrange this clock outside the module containing the microchip and to divide the clock frequency to a lower value. To this end, a 3-bit frequency divider for example is provided between the clock CLK and the clock input CKIN of the package, enabling a clock signal CKIN to be produced at the frequency Fo/8 = 1.75 MHz. The clock CLK has an input to which the signal FMAT is applied to modify the frequency of the output signal when the format of the TV image is modified. This clock CLK may optionally have a second control input for regulating its operating frequency in dependence upon the frequency of the industrial power supply network at 50 Hz. The three-stage frequency divider is formed by a synchronous counter CNT·$\phi$; the outputs SO-S2 of each of the stages are available for controlling the image memory IM in the reading mode.

The control unit comprises:

a counter formed by two linked synchronous counters: a modulo 112 = 896/8 counter CNT·S and a modulo 312 or 312.5 (depending on the format of the TV image) counter CNT·L, these counters comprising means for modifying the format of the TV image, in particular a counter for the order of the running frame (even/odd). They deliver the reading address signals directly to the address multiplexer through the bus MXRA:

a logic means for producing signals (SYNC) for synchronizing the TV scan from the recognition of the states of the counters S and L;

a logic means for producing luminance signals (LUM) and a signal GUWE for validating the control unit and for controlling the multiplexer for the reading and writing address signals.

One embodiment of a control unit comprising the means listed above is described in applicant's French patent application entitled "A Signal Generator for a Graphic Console" filed on the same date as the present application.

Figure 5:
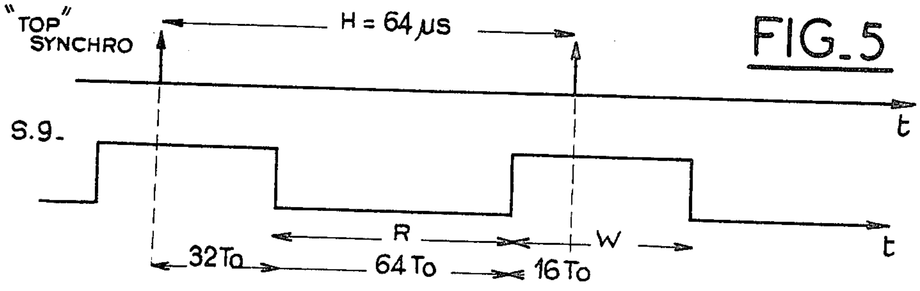
FIG. 5 shows the wave form of the control signal for the reading mode and the writing mode.

At its output of most significant bit (MSB), the dot counter CNT·S delivers a signal S9 which defines the periods R for reading and displaying the content of the image memory IM and the periods W for writing into the image memory. The period H of a TV line is approximately 64 μs corresponding to a time 112 To (To=period of the clock signal CKIN). In FIG. 5 for example, the centring of the signal S9 in relation to the TV line synchronizing "pulses" may be 32 To on the left and 16 To on the right, the graphic display period being 64 To.

Figure 6:
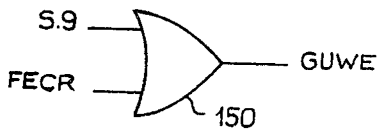
FIG. 6 shows the means for forcing the processor to the writing mode.

In normal operations, the signal S9 determines the reading and writing phases of the processor. A signal FECR at the high level enables the operation of the processor to be forced into the writing mode in order to accelerate a vector or symbol drawing operation which, as shown in FIG. 6, may be effected by a logic gate 150 of the "OR" type having two inputs, a first input receiving the signal S9 and a second input the signal FECR. The output of this gate is the signal GUWE which authorizes a drawing and data writing operation corresponding either to a line segment (vector) or to a symbol.

Figure 7:
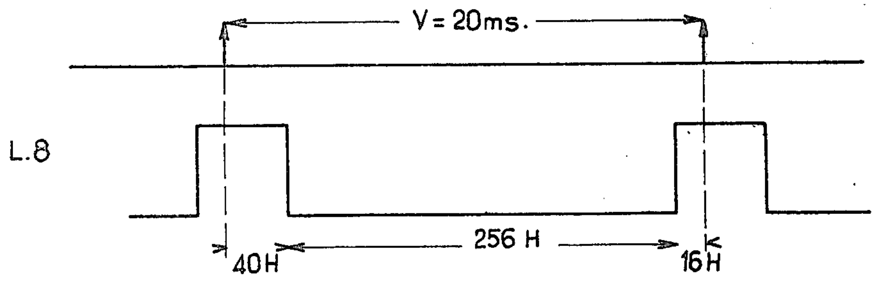
FIG. 7 shows the wave form of the frame signal of the graphic image.

At its output of most significant bit (MSB), the line counter CNT·L delivers a signal L8 which defines the frame periods of the graphic image of which the duration is either 312 H or 312.5 H (H=TV line period), depending on the format of the TV image. The total period of this signal L8, also referred to as the "graphic image frame", is 20 ms. As shown in FIG. 7 for example, the centring of this signal L8 in relation to the TV frame synchronizing "pulses" may be 40 lines on the left and 16 lines on the right. This "graphic image frame" signal is used in the processor for carrying out an operation to erase or record a black or white background screen. It is also used for locating the position of a light pen on the CRT screen.

Symbol generator

The symbol generator produces alphanumeric characters and particular figures (quadrilaterals) designated by the mnemonic QUAD.

Figure 8A:
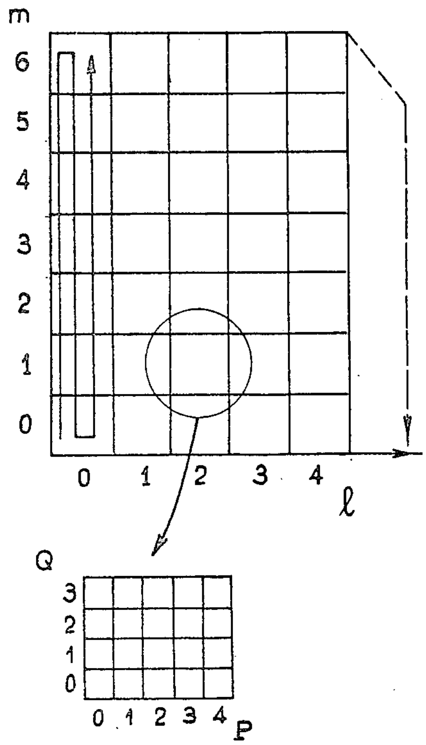
FIGS. 8*a* and 8*b* show the matrix of dots enabling a graphic symbol to be drawn.
Figure 8B:
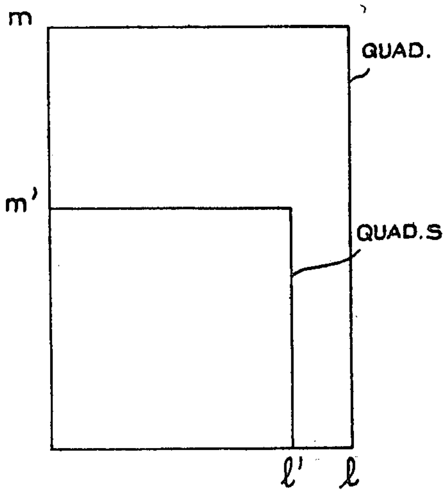
Figure 9:
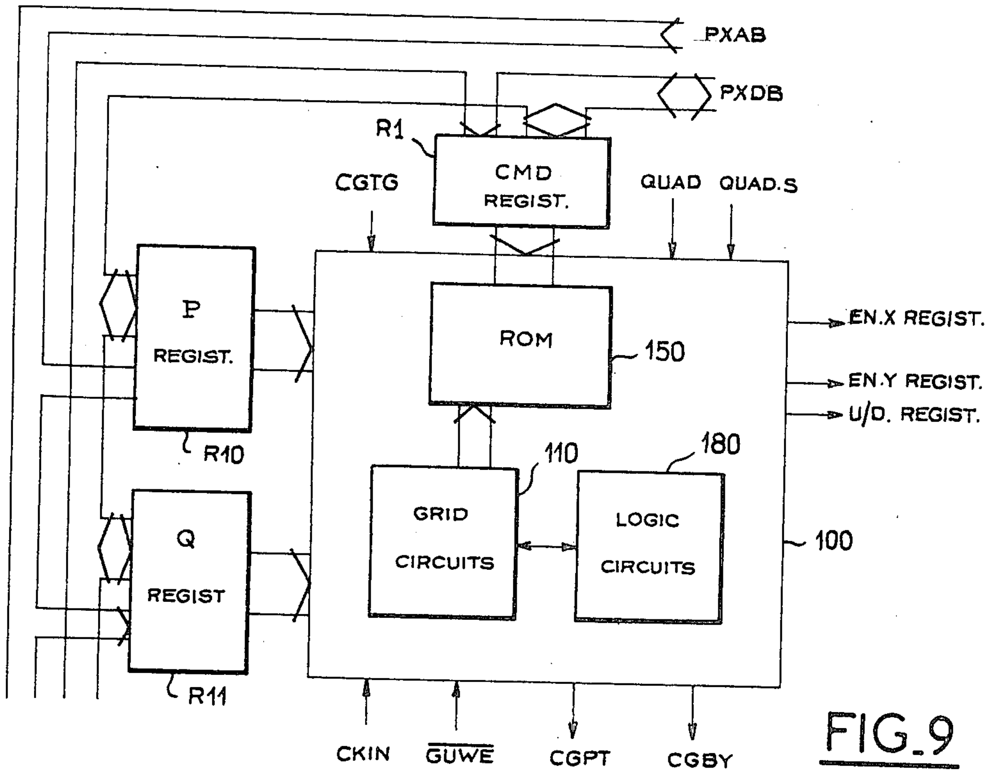
FIG. 9 shows the constituent means of the symbol generator in the form of a functional block diagram.

As shown in FIG. 8*a*, the various symbols are generated from a matrix of 1×m spaces, each space forming a sub-matrix of P×Q dots to form a grid of 1P×mQ dots, where P and Q are scale factors of the symbols which enable the size of the displayed symbols to be modified as required. FIG. 8*b* shows symbols QUAD: a QUAD in a format l×m and a QUAD·S in a format l'×m' with l'<l and m'<m. The QUAD (l×m format) may be used in particular for erasing a character which has already been recorded in the image memory. The QUAD·S (l'×m' format) enable "chequer boards" to be displayed. The symbol generator (designated by the mnemonic CG) is shown in a modular form in FIG. 9. The symbol generator 100 essentially comprises: a means 110 for constructing a grid of 1P×mQ dots; a read-only character memory (ROM) 150 and a logic means 180 for sequencing the means 110 and for producing the incrementation/decrementation signals of the X and Y registers of the pointer of the reading addresses of the image memory. The registers associated with the symbol generator are: the register R1 CMD REGIST and the registers R10 and R11 which contain the scale factors P and Q and which are designated P·REGIST and Q·REGIST.

The symbol generator is sequenced by the clock signal CKIN on the condition that the signal $\overline{\text{GUWE}}$ produced by the control unit is at the high level. A symbol drawing operation is released by a release signal CGTG.

One embodiment of the means listed above is described in applicants' French patent application entitled "A Symbol Generator for a Graphic Console" filed on the same date as the present Application.

Vector Generator

The vector generator (VG) enables line segments to be drawn in the form of continuous or punctuated lines. The input data of the vector generator are:

- the modules of the M and N components of the vector respectively following the X and Y axes of the graphic image;
- and the direction (ARG) of the 3-bit coded vector.

The vector generator enables three types of vectors to be drawn:

- "long" vectors of any direction which are specified by the instruction words H'10' to H'17';
- "long" vectors of preferential direction which are specified by the instruction words H'18' to H'1F';
- "short" vectors (VECT·S) specified by the instruction words H'80' to H'FF'.

Figure 10:
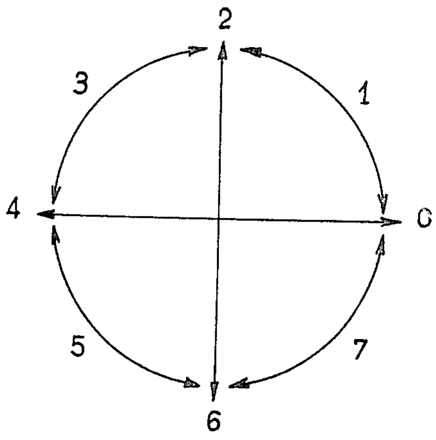
FIG. 10 shows the format of a control word corresponding to a "short" vector.

FIG. 10 shows the direction code of the vectors during the drawing of a vector of preferential direction, the directions corresponding to the directions parallel to the X and Y axes and to the diagonals of the graphic image.

Figure 11:
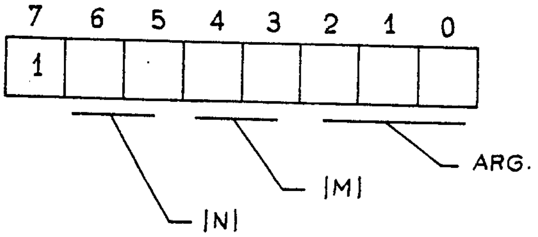
FIG. 11 shows the direction codes of the vectors.

FIG. 11 shows the format of a word of a short vector specified on an octet by which it is possible to draw vectors for which:

$$0 \leq |M| \leq 3 \text{ and } 0 \leq |N| \leq 3$$

The M and N components of the long vectors are specified by a data words of one octet by which it is possible to draw vectors for which:

$$0 \leq |M| \leq 255 \text{ and } 0 \leq |N| \leq 255$$

The vectors may be drawn in four types of different lines:

| Code | Type of line |
|---|---|
| 00 | continuous |
| 01 | dotted |
| 10 | chain |
| 11 | mixed |

Figure 12:
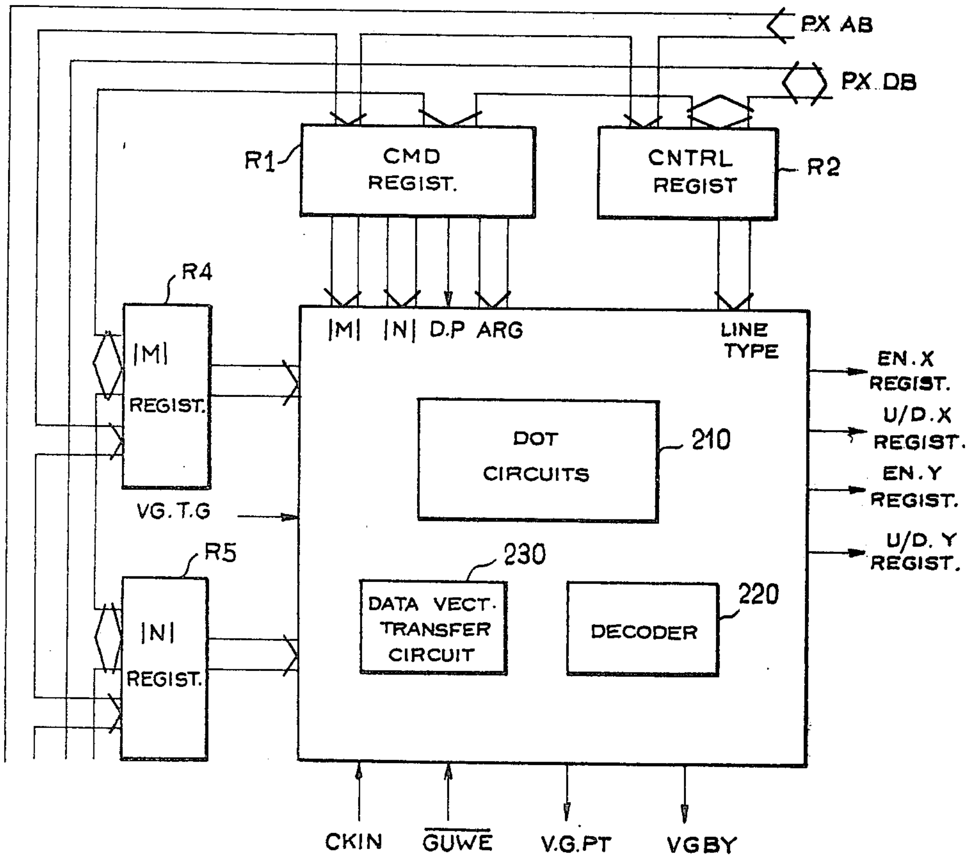
FIG. 12 shows the constituent means of the vector generator in the form of a functional block diagram.

FIG. 12 shows in a modular form the principal constituent elements of the vector generator. The vector generator is connected to the internal data and address buses PXDB and PXAB; it is associated with the following registers:

- the register |M| REGIST which enables the component |M| of the vector to be stored,
- the register |N| REGIST which enables the component |N| of the vector to be stored,
- the register CMD REGIST which enables the instruction words to be stored; the three less significant bits always carry the direction code of the vector; a short vector (VECT·S) instruction word specifies the components |M| and |N| of the vector; a "preferential direction vector" instruction word enables a signal identified by the attribute D·P in FIG. 12 to be produced, the register CNTRL·REGIST which stores the control word in which the two less significant bits specify the type of lines to be drawn.

The vector generator comprises three essential elements:

the means 210 for producing the dots of the vector in synchronism with the clock signal CKIN;

the means 200 for decoding the code bits which specify the direction of the vector;

the means 230 for applying the data and the type of vector to be drawn to the inputs of the means 210.

The vector generator receives the clock signal CKIN, the signal $\overline{GUWE}$ which, at the high level, validates a vector during operation and the signal VGTG which releases a vector drawing operation.

The vector generator delivers a signal EN X REGIST which enables the X register of the writing pointer to be validated, a signal U/D X REGIST which specifies the counting direction of the X register of the writing pointer, a signal EN Y REGIST which enables the Y register of the writing pointer to be validated, a signal U/D Y REGIST which specifies the counting direction of the Y register of the writing pointer, a signal VGPT for validating a writing operation in the image memory; this writing operation may be either an "alight" dot for a line segment to be displayed or an "extinguished" dot for a line segment to be erased, as will be described hereinafter.

One embodiment of the means listed above is described in applicants' French patent application entitled "A Vector Generator for a Graphic Console" filed on the same date as the present Application.

Image memory

Figure 13A:
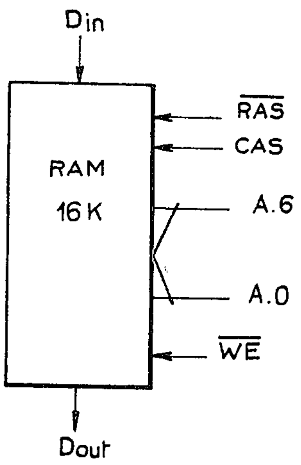
FIGS. 13*a* and 13*b*, show in a symbolic form a memory module and the wave forms of the principal control signals.

FIG. 13*a* shows in a symbolic form a 16 K×1 bit memory module of the multiplexed addressing dynamic type. The memory 16 K is organized into a matrix of 128 rows and 128 columns and the principal associated signals are the following:

a signal $\overline{RAS}$ (row address select) of which the leading edge samples the first part or lower part of the address;

a signal $\overline{CAS}$ (column address select) of which the leading edge samples the second part or upper part of the address;

a signal $\overline{WE}$ (write enable) which indicates whether the operation is a reading or writing operation;

address signals A0–A6.

Figure 13B:
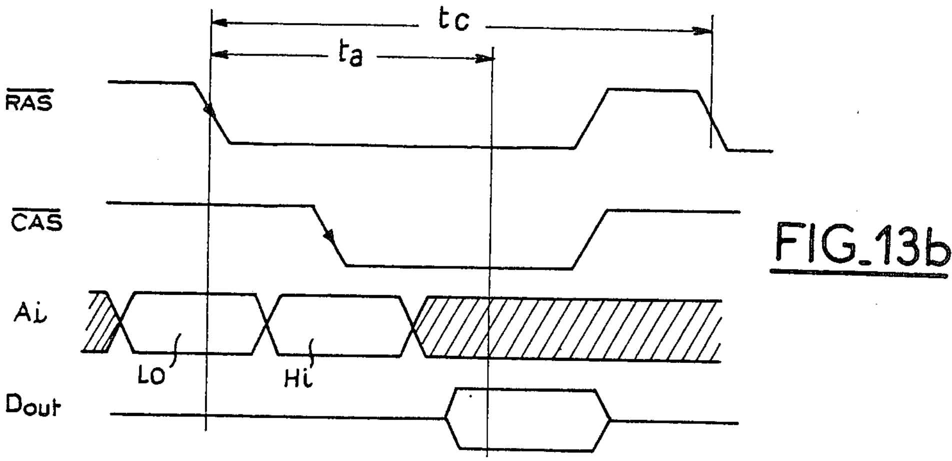

The memory contains as many refreshment amplifiers as there are columns so that, in the event of a memory access, one complete row of memory cells is refreshed. In every case, if the signal $\overline{RAS}$ or the signal $\overline{CAS}$ is at the high level, the memory module is not affected by a memory access. This property may be used for selecting the various modules through the signal $\overline{RAS}$, the signal $\overline{CAS}$ being continually generated for all the modules which make up the image memory. FIG. 13*b* shows the wave forms of the signals $\overline{RAS}$, $\overline{CAS}$, Ai and Dout; in this Figure, tc represents the cycle time and ta the memory access time.

Figure 14:
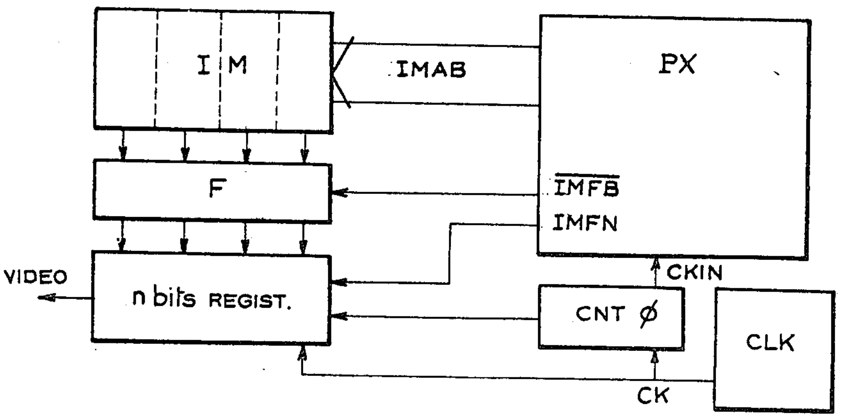
FIG. 14 shows the connections between the image memory and the processor.

FIG. 14 shows the connections between the image memory IM and the processor PX, the clock CLK and the counter CNTϕ.

The video output signal of the image memory successively represents the state of all the dots of this memory. For a definition of 512 dots per line, the period of time separating two consecutive dots is of the order of 100 ns, i.e. is distinctly shorter than the cycle times of currently available memory modules for which the cycle time is of the order of 350 ns. It is necessary simultaneously to read several dots differentiated solely the power part of their horizontal address and then to serialize them by means of a shift register for forming the video signal. Accordingly, the image memory has to be organized into words. In addition, the organization of the memory is dependent on the format adopted for the graphic image and may be for example the following:

| Definition | Memory modules | | Organization | |
|---|---|---|---|---|
| (dots) | Number (N) | Type | Words | Bits (n) |
| (512 × 512) | 16 | 16 K bits | 32 K words | 8 bits |
| (256 × 256) | 4 | 16 K bits | 16 K words | 4 bits |
| (128 × 128) | 4 | 4 k bits | | |
| | 2 | 8 bits | 8 K words | 2 bits |
| (64 × 64) | 1 | 4 K bits | 4 K words | 1 bit |

Referring to FIG. 14, it can be seen that the image memory IM is formed by N memory modules addressed by the address bus IMAB connected to the processor PX. The outputs of the memory modules are connected to a means "F" which enables them to be forced to the "white" level. The outputs of this means F are connected to an n-bit shift register which receives the signal CK from the clock CLK and which is controlled on the one hand by an output of the counter CNTϕ and, on the other hand, by the signal IMFN which enables the video output signal of the register to be forced to the "black" level. The clock signal CKIN has a frequency of 1.75 MHz for the (512×512) format and a frequency of 1.747 MHz for the formats of lower definition and the number of sections of the counter CNTϕ is equal to "n", the length of one memory word in the reading mode. Another solution, which is illustrated in FIG. 4, is to have a clock CLK of which the output frequency is 14 MHz for the (512×512) format and 13.98 MHz for the smaller formats, and a modulo 8 counter CNTϕ of which the outputs S0, S1 and S2 are used in accordance with the selected format.

So far as the addressing of the image memory in the writing mode is concerned, it should be noted that the graphic unit has access to the cells of the memory one by one through the writing pointer. It is therefore necessary to use the lower part of the horizontal writing address for selecting the cell affected by a writing operation. Considering solely the formats (512×512) 16 modules and (256×256) 4 modules, it is out of the question to reserve 16 pins of the module of the processor for selecting the memory modules. The modules are selected solely by the 4 pins marked IMSL on the module of the processor.

In order to illustrate this, FIGS. 15, 16, 17 and 18 show the organisation of the image memory for the various formats of the graphic image.

Figure 15:
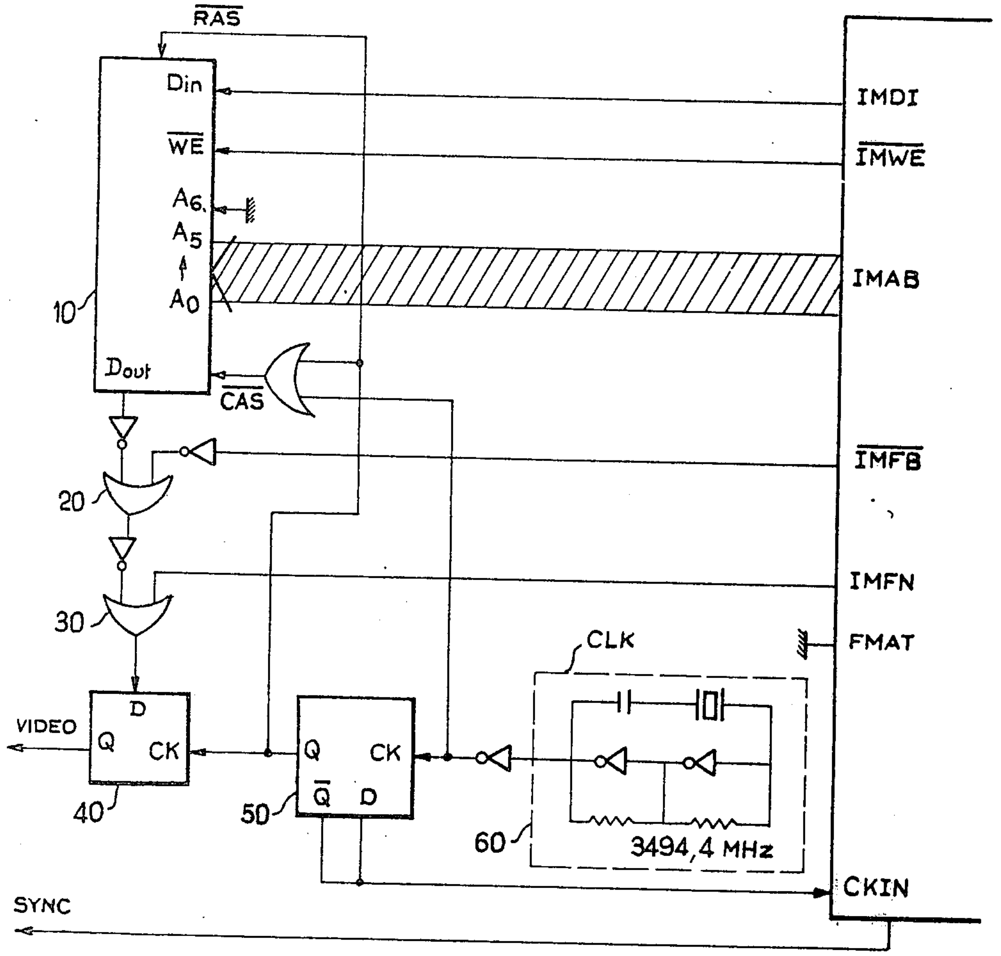
FIG. 15 shows the organization of the image memory in a (64×64) dot configuration.

FIG. 15 corresponds to a (64×64) dot format. The image memory is formed by a module 10 of 4 K bits. The means for forcing to the "white" level is formed by the logic gate 20 of the "OR" type, whilst the means for forcing to the "black" level is formed by the logic gate 30 of the "OR" type. Since the output of the memory is not always valid, a flip-flop 40 of the D-type is provided at the "video" output. The dot clock CLK operates at twice the dot frequency to produce the signal $\overline{\text{CAS}}$. The element 50 is a divider by 2. The terminals IMSL for selecting the modules are not involved in this application.

Figure 16:
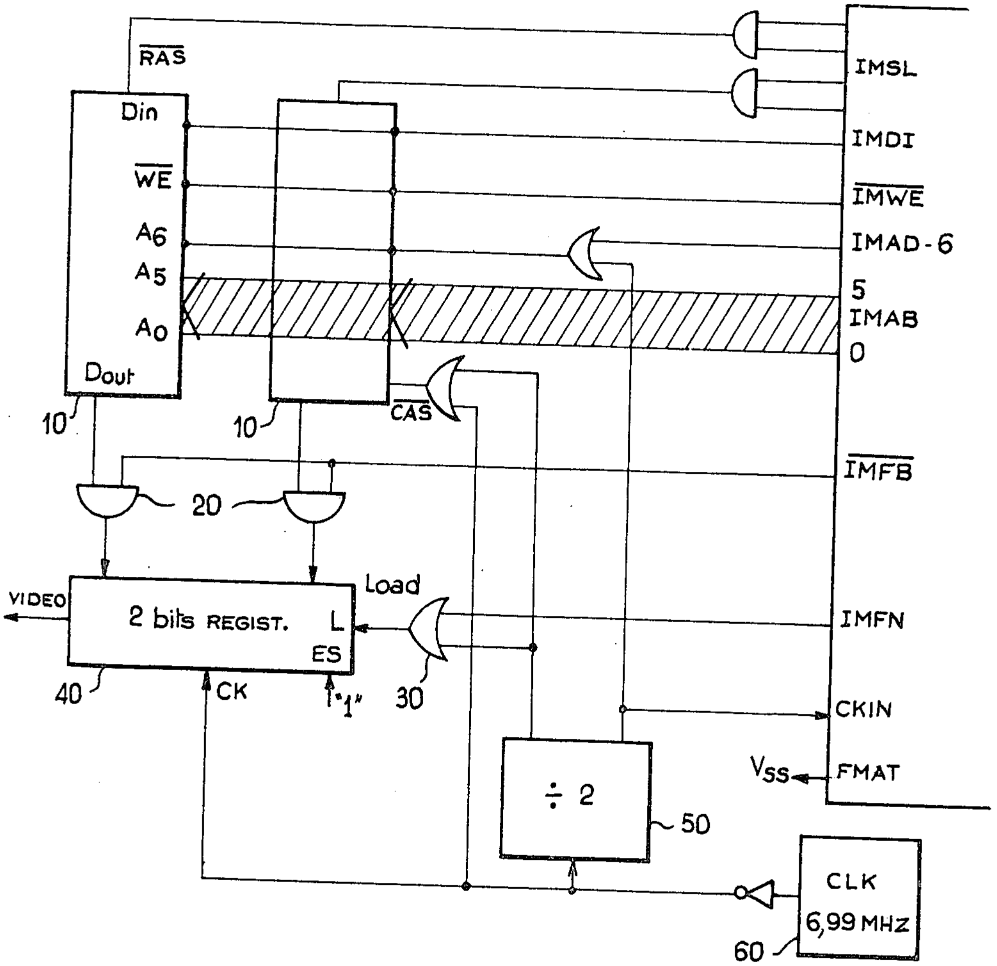
FIG. 16 shows the organization of the image memory in a (128×128) dot configuration.

FIG. 16 corresponds to a (128×128) dot format. The image memory is formed by two modules 10 of 8 K bits. The pin IMAD-6 is only used for its lower part. The means for forcing to the "white" level is formed by the logic gates 20 of the "AND"-type. The element 40 is a shift-register having a length of 2 bits. Through the logic gate 30 of the "OR" type, the signal IMFN inhibits the loading of the register 40. If, under these conditions, the series input ES of the register 40 is at the upper level "1", the "video" output signal may be forced to the "black" level. Other configurations of the image memory may be envisaged, for example 4 modules of 4 K bits or 1 module of 16 K bits providing its cycle time is less than 275 ms. In the latter case, the additional address signal is supplied by the outputs IMSL in the writing mode and by the external divider 50 in the reading mode.

Figure 17:
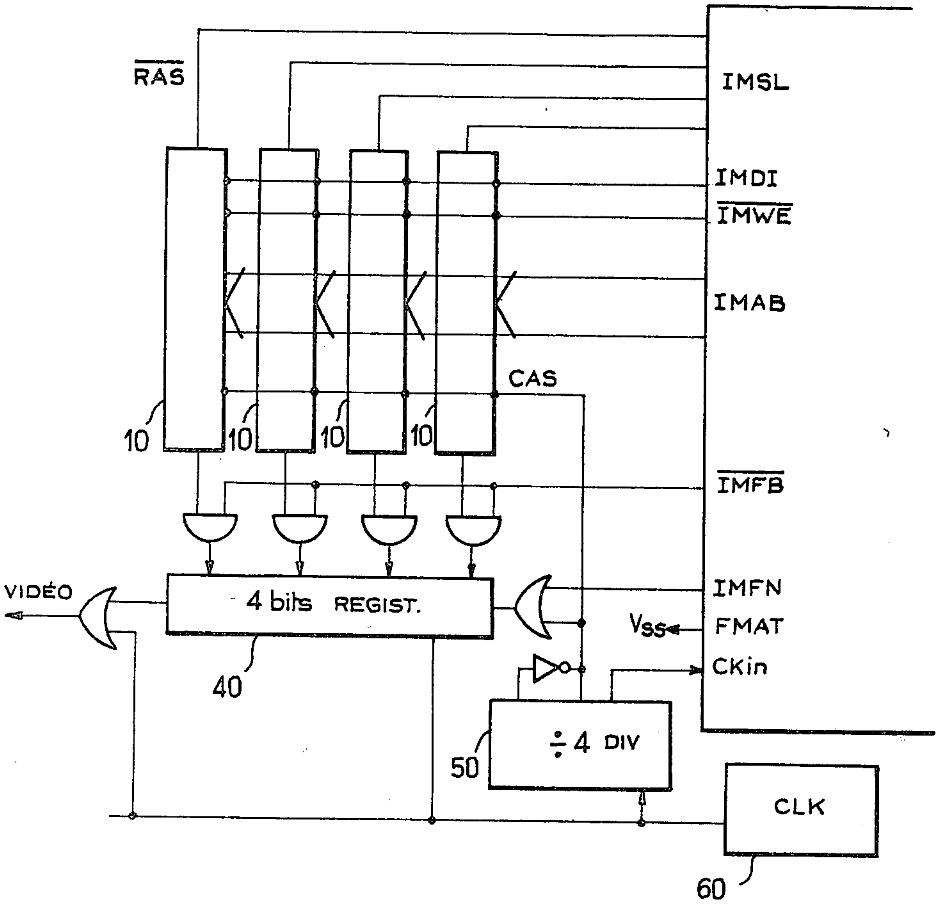
FIG. 17 shows the organization of the image memory in a (256×256) dot configuration.

FIG. 17 corresponds to a (256×256) dot format. The image memory is formed by 4 modules of 16 K bits. This layout is similar to the preceding layout and does not call for any particular development.

Figure 18:
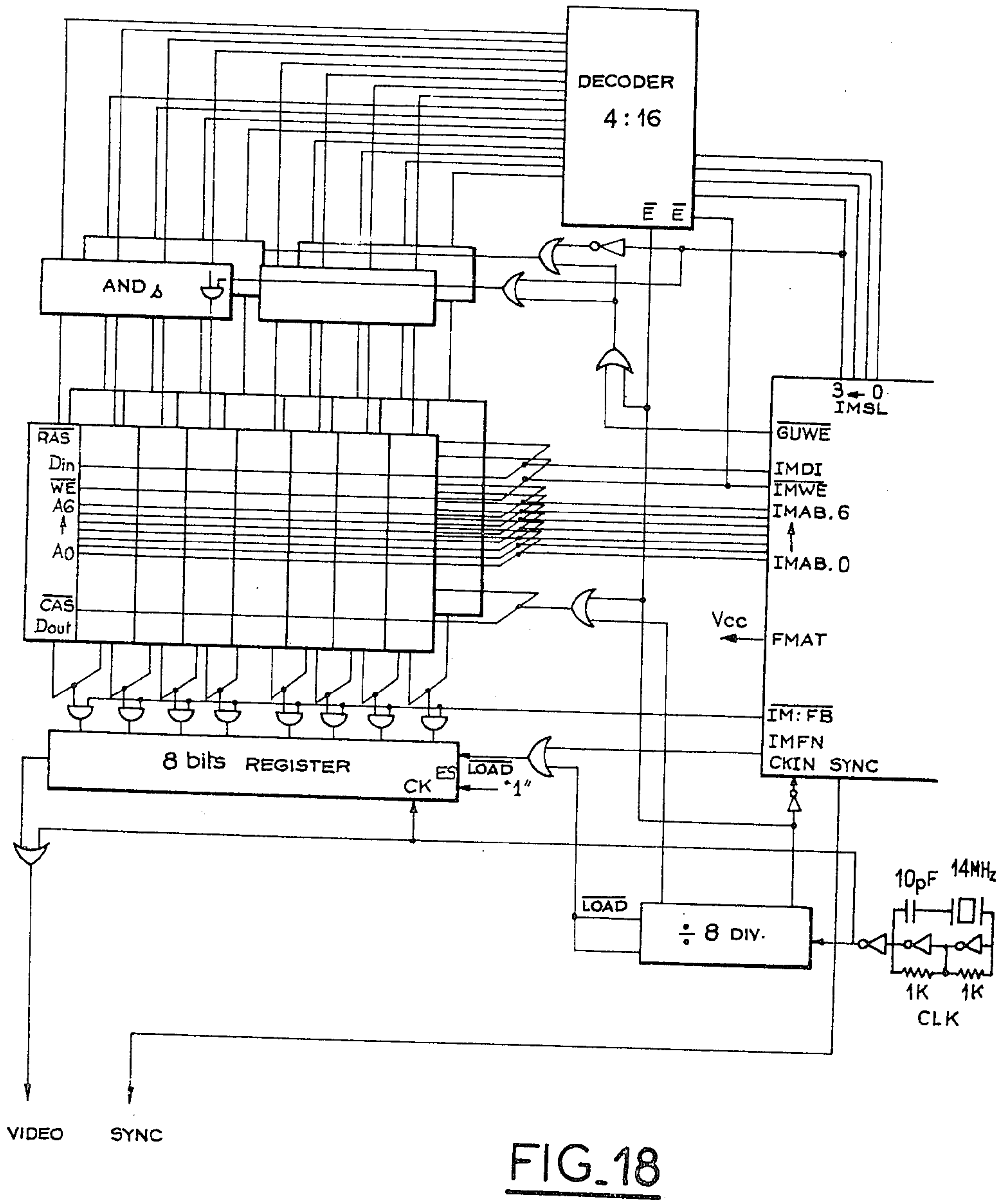
FIG. 18 shows the organization of the image memory in a (512×512) dot configuration.

FIG. 18 corresponds to a (512×512) dot format. The image memory is formed by 16 modules of 16 K bits arranged in two halves of 8 modules. In the case of a reading operation, a complete half is selected by combining the signal $\overline{\text{GUWE}}$ and the signal IMSL-3 which in this case corresponds to a reading address. All the memory dots are collectively read on two TV frames. The separation of the TV lines according to their parity does not coincide with the separation of the memory into two halves, otherwise one half would not be refreshed during a TV frame. The half used is switched every two lines of the same frame (through the signal IMSL-3), i.e. every 128 accesses.

Writing pointer

Figure 19:
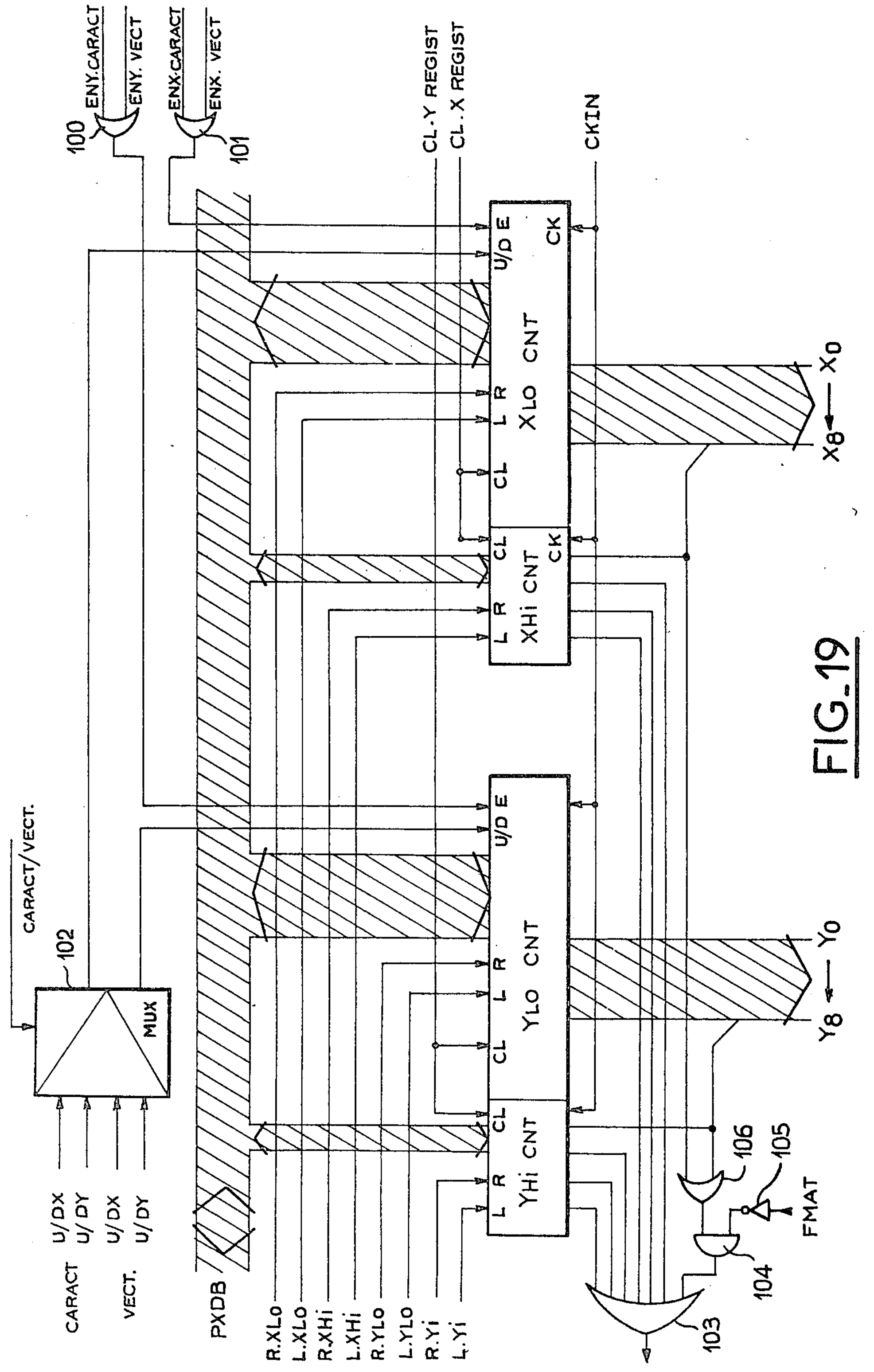
FIG. 19 shows the circuit diagram of the writing pointer.

The writing pointer PNT enables the image memory to be addressed so that the image data produced by the vector generator and the symbol generator may be recorded therein. The writing pointer is shown in the form of a logic diagram in FIG. 19.

The writing pointer supplies the address signals of the image memory on 18 bits X0 to X8 and Y0 to Y8. It is formed by two 12-bit up/down counters of the synchronous type which can be incremented by the clock signal CKIN. The writing pointer thus comprises:

a counter X which comprises a low part XLoCNT of 8 bits and a high part XHiCNT of 4 bits;

a counter Y which comprises a low part YLoCNT of 8 bits and a high part YHiCNT of 4 bits.

The writing pointer enables a space of 4096×4096 discrete dots to be addressed. It is accessible in the writing mode (loading) and in the reading mode for the internal bus PXDB of the processor. The content of the counters X and Y may be cleared by the command signals CL·Y·REGIST and CL·X·REGIST. Each of the counters CNT may be loaded by command signals LX and LY and may be read under the action of the command signals R·X and R·Y. The command signals of the writing pointer are the validation signals ENX and ENY and the counting direction signals U/DX and U/DY supplied either by the vector generator or by the symbol generator of which the operation is mutually exclusive, bearing in mind that the signals U/D do not have a majority state. The foregoing considerations lead to the introduction of a multiplexer MUX 102 between the inputs of the counters X and Y and the counting direction signals U/DX, UDY CARACT and U/DX, UDY VECT, this multiplexer MUX being controlled by a signal CARACT/VECT. By contrast, the signals ENX and ENY may be directly multiplexed by means of operators 100 and 101 of the "OR"-type. It is necessary to check the content of the upper parts of these counters in order to prevent writing into the image memory when the addressed space is above the space of the graphic image. To this end, a logic operator 103 of the "OR"-type recognises whether the values of the high parts of the counters are different from zero. The output state of the operator 103, which indicates whether the dot is outside the screen, depends on the signal FMAT which is at the high level when the format of the graphic image is 512 dots. This output state is modified by the operator 104 of the "AND"-type which, at a first input, receives the signal FMAT complemented by an operator 105 of the I-type and, at its second input, the logic sum of the address signals X8 and Y8 through the logic operator 106 of the "OR"-type.

The output signal of the operator 103 which controls the state of the high parts of the counters appears in the state word of the processor and prevents image data from being written into the image memory unit.

The instruction signals of the registers are the following:

the clearing signals CL·X REGIST and CL·Y REGIST
the loading signals L·HLo, L·XHi, L·YLo and L·YHi
the reading signals R·XLo, R·XHi, R·YLo and R·YHi.

Multiplexers for the address signals

The processor comprises three multiplexers for the address signals; these address signals are the following:

reading address signals;
low part: S0, S1, S2 available outside the module;
S3, S4, S5, S6, S7, S8 supplied by the control unit;
high part: frame parity, L0, L1, L2, L3, L4, L5, L6, L7 supplied by the control unit;

writing address signals supplied by the writing pointer:
low part X0, X1, X2, X3, X4, X5, X6, X7, X8
high part Y0, Y1, Y2, Y3, Y4, Y5, Y6, Y7, Y8.

These address signals have to be multiplexed according to the reading mode and writing mode of the processor. The control signal of this multiplexer is thus the signal $\overline{\text{GUWE}}$ at the low level in the writing mode. These low and high address signals have to be multiplexed in order to reduce the number of output pins of the processor. Accordingly, the command signal for this multiplexer is the clock signal CKIN.

Different writing address signals have to be associated with the reading address signals in dependence upon the input signal FMAT which specifies the format of the TV image.

In addition, the address signals have to be distributed between the outputs IMAB and IMSL.

Figure 20A:
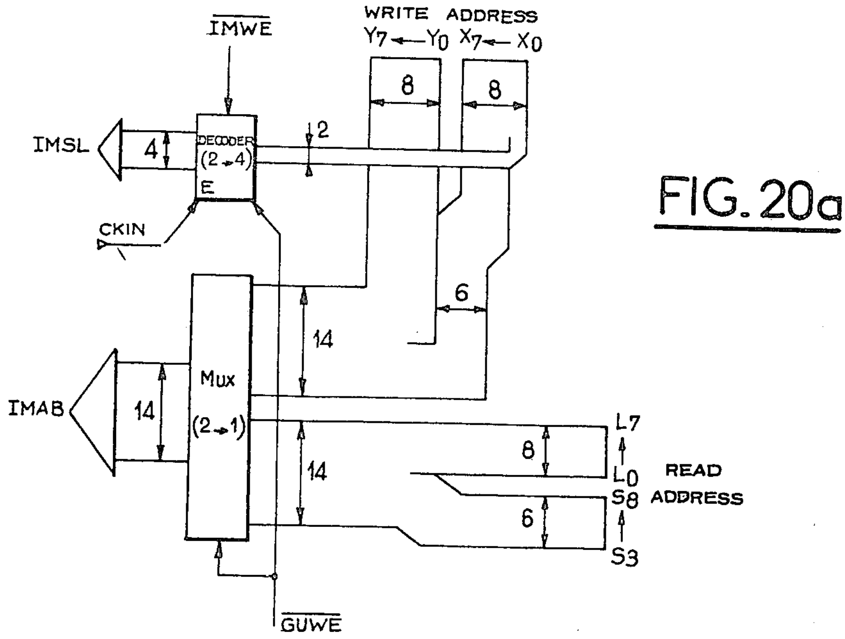
FIGS. 20*a*, 20*b* and 20*c* show the distribution of the reading and writing address signals.
Figure 20B:
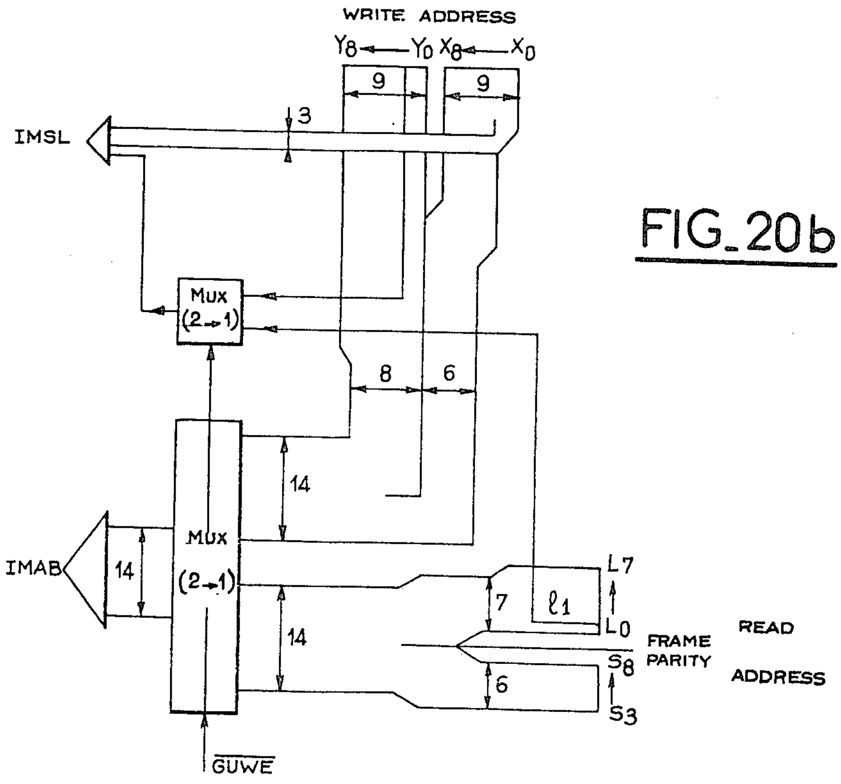
Figure 20C:
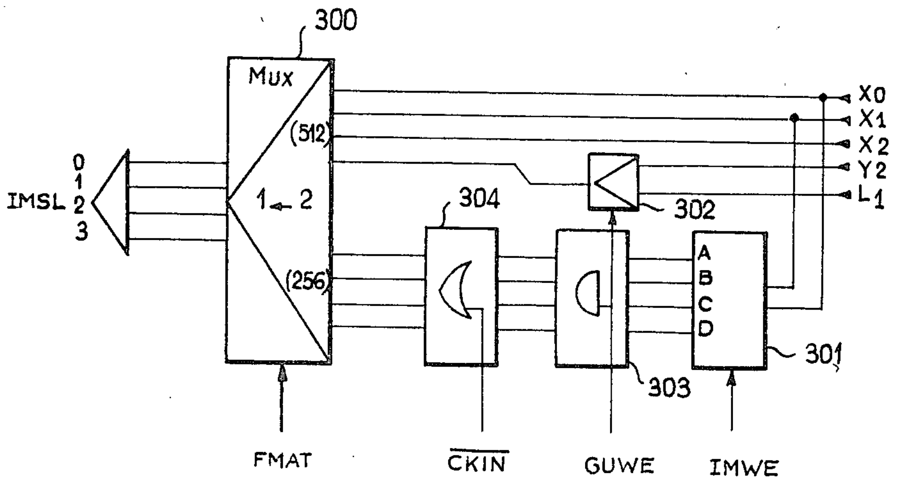

FIGS. 20*a*, 20*b* and 20*c* show the distribution of the various address signals. FIG. 20*a* corresponds to the (256×256) and lower formats; FIG. 20*b* corresponds to the (512×512) format and FIG. 20*c* shows in detail the distributions of the outputs IMSL for all the formats.

The construction of the multiplexers, which does not involve any particular problems, will not be described in any more detail.

Connection with the bus MPU

The signals allowing dialogue with the external command unit MPU are available on the address bus MPAB, on the two-way data bus MPDB and on two terminals, a first terminal which carries the temporal exchange signal $\overline{\text{MPCE}}$, which is active at the low level, and a second terminal which carries the signal MPR/$\overline{\text{W}}$ which specifies whether the operation is a writing operation (loading of data) or a reading operation (transfer of contents) in the internal registers of the processor.

Figure 21A:
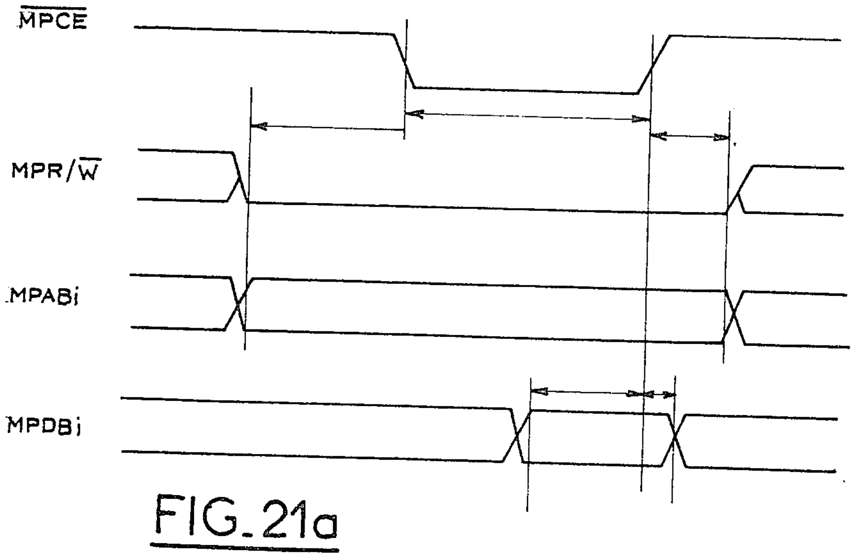
FIGS. 21*a*, 21*b* and 21*c* show the wave form of the signals allowing dialogue with the control unit MPU.
Figure 21B:
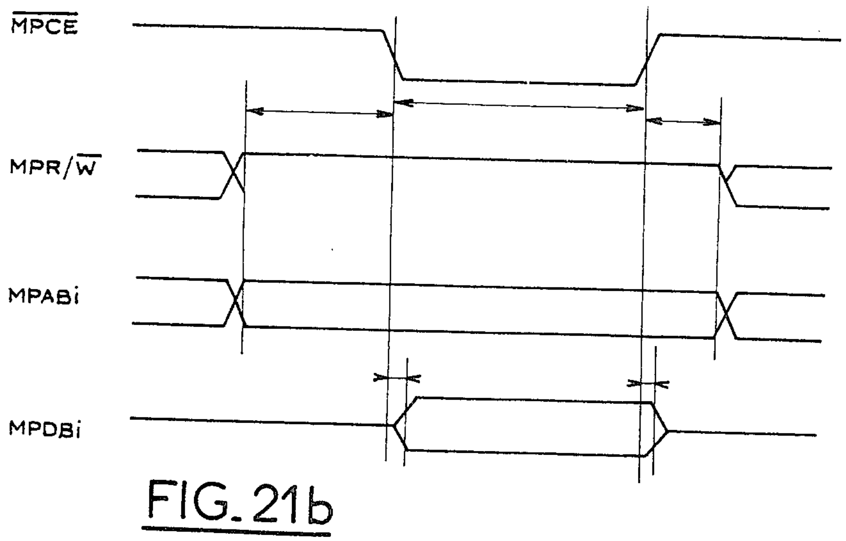
Figure 21C:
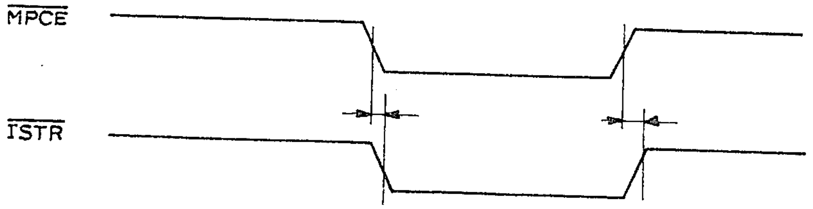

FIGS. 21*a*, 21*b* and 21*c* shows chronograms of the signals $\overline{\text{MPCE}}$ and MPR/$\overline{\text{W}}$ vis-a-vis the address signals MPAB and the data signals MPDB. FIG. 21*a* shows the wave form of the signals corresponding to a loading operation, MPR/$\overline{\text{W}}$ at the low level. FIG. 21*b* shows the wave form of the signals corresponding to an operation in which the content of the registers is transferred to the bus MPDB. FIG. 21*c* shows a particular signal $\overline{\text{ISTR}}$. This signal is a counterpart of the signal $\overline{\text{MPCE}}$ and is independent of the signal MPR/$\overline{\text{W}}$. As will be explained hereinafter, this signal $\overline{\text{ISTR}}$ is intended where necessary for an external register for particular applications, such as the display of a coloured graphic image.

Figure 22:
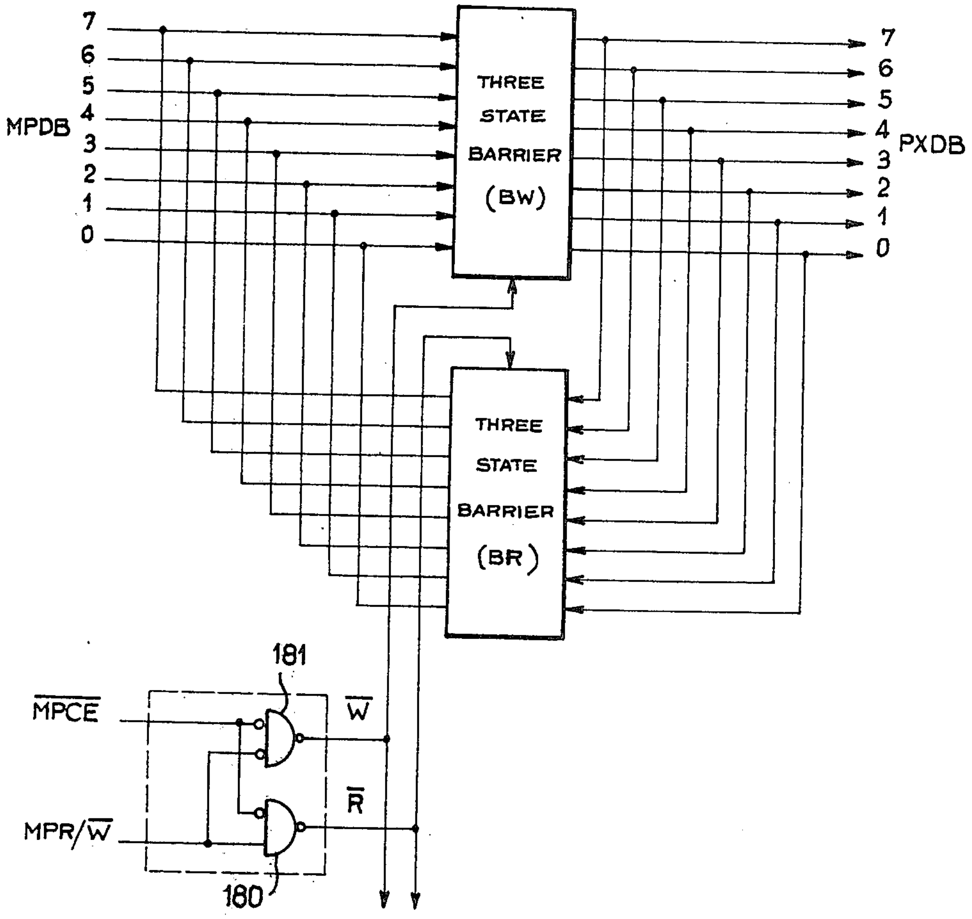
FIG. 22 shows the input/output means of the data bus MPDB.

FIG. 22 shows the means for connecting the bus MPDB to the internal three-state bus PXDB. The blocks BW and BR enable a three-state barrier to be formed. The block BW is activated by a request to load the registers whilst the block BR is activated by a reading operation affecting the registers.

The logic gates 180 and 181 form a decoder for the dialogue signals $\overline{\text{MPCE}}$ and MPR/$\overline{\text{W}}$. This decoder delivers two command signals $\overline{\text{W}}$ and $\overline{\text{R}}$ for the blocks and for the decoding means of the address signals which will be described hereinafter.

Figure 23A:
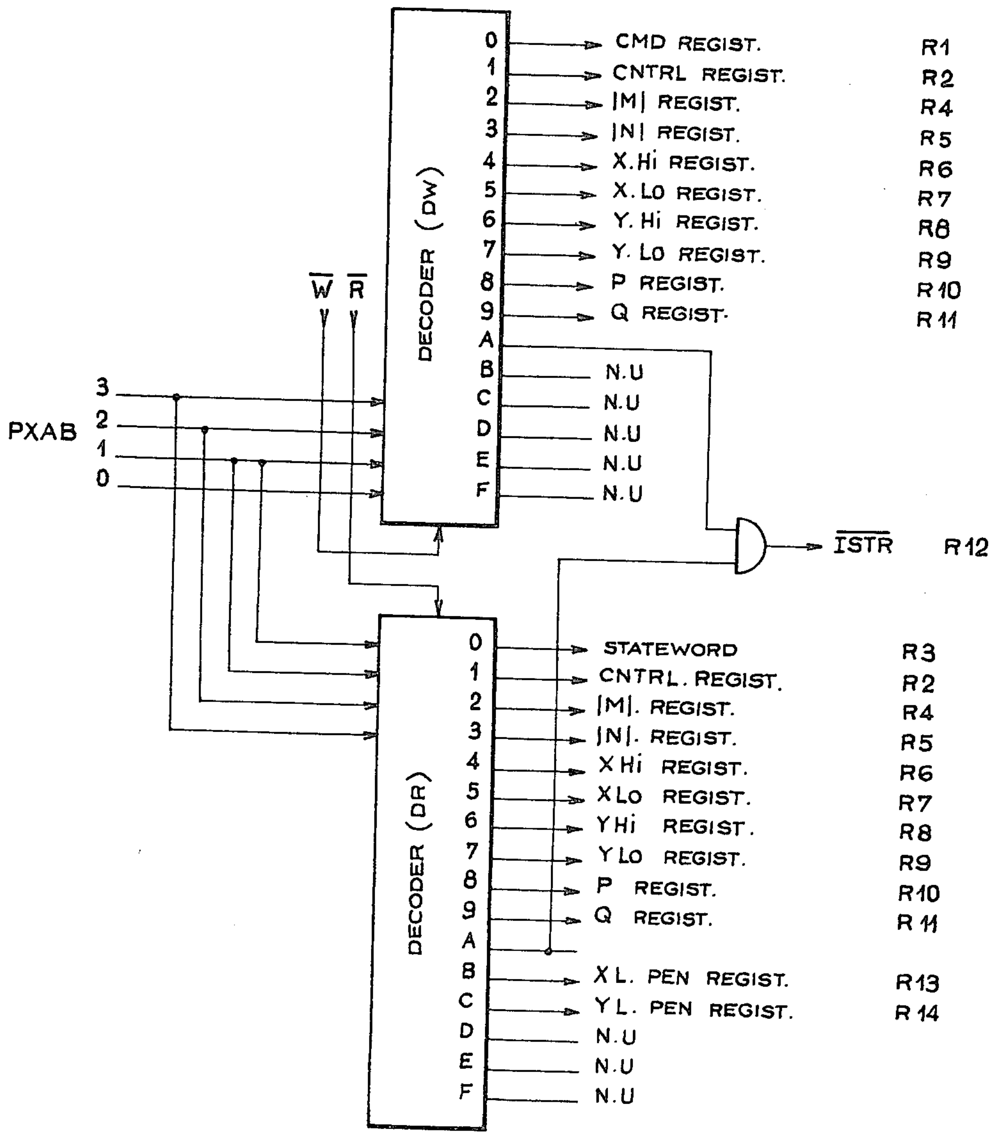
FIG. 23 shows the means for decoding the address words.

FIG. 23*a* shows the means for decoding the address signals available on the internal address bus PXAB. These means comprise a means DW for decoding the loading addresses of the registers and a means DR for decoding the reading addresses of the registers. They are controlled by the signals $\overline{\text{W}}$ and $\overline{\text{R}}$ supplied by the decoder for the exchange signals. The signal $\overline{\text{ISTR}}$, which corresponds to the address H'A' decoded in the writing and reading modes by means of the logic gate of the "AND"-type, may be used either solely for reading or solely for writing or for both reading and writing, depending on the programming of the command unit MPU.

Figure 23B:
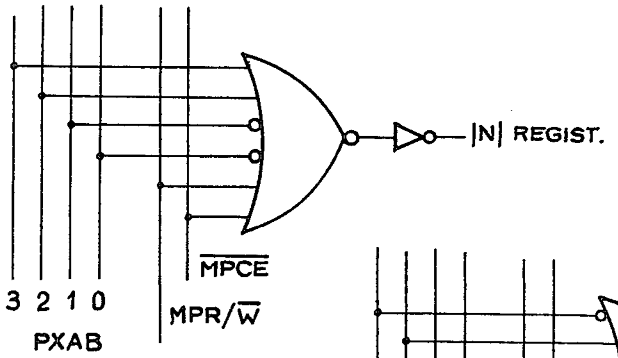
Figure 23C:
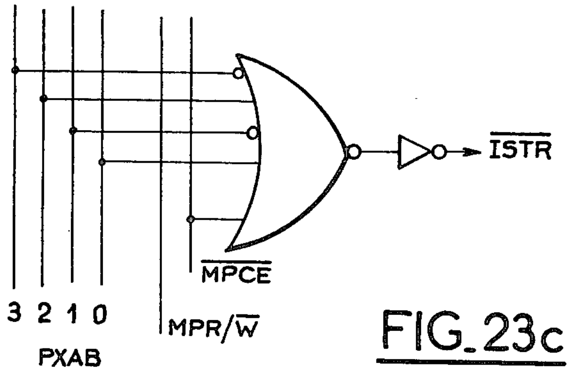

One embodiment of the address decoders is shown in FIGS. 23*b* and 23*c*. FIG. 23*b* shows the decoding of the address H"3' which corresponds to the loading instruction of the register N REGIST, whilst FIG. 23*c* shows the decoding of the address H'A' which corresponds to the instruction $\overline{\text{ISTR}}$. These means for decoding the addresses are formed by a logic gate of the "NOR"-type and by an inverter of the "I"-type.

Command register, synchronisation and decoding of the commands

The command register CMD REGIST is an 8-bit register of the "latch" type (locked). It is accessible solely in the writing (loading) mode through the internal data bus PXDB, corresponding to the address space H'O". It delivers the command words which have to be decoded and, for some, the decoding operation has to be in synchronism with the internal clock signal of the processor.

The commands may be conceptually divided into two groups: "static" and "dynamic";

the static commands are simple combinatorial functions of the command register and act as a parameter on the various automatic functions, for example: drawing direction of a vector, erasing or recording a background of the display screen;

the dynamic commands supply signals for "arming" the various generators; they are activated during a clock period CKIN while the graphic unit is validated which corresponds to the high level of the signal GUWE; they are used for example for starting a drawing operation, for clearing the writing pointer, etc.

Figure 24A:
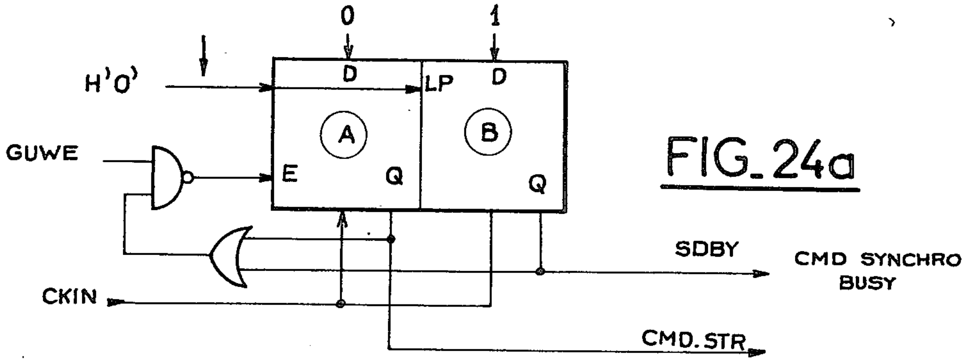
FIGS. 24*a* and 24*b* show the means for synchronizing the instructions.

The means for synchronizing the "arming" signals with the clock signal of the processor is shown in FIG. 24*a*. This means is formed by a two-bit counter: the section A corresponds to the less significant bit and the section B to the most significant bit. The synchronizing means is used to select the first period of the signal CKIN which follows the appearance of the address signal H'O' (loading of the CMD. REGIST). The section A is initialised with the value "0" and the section B with the value "1". The activation of this commandsynchronising element results from a priority asynchronous loading at the input LP of the address signal H'O'.

Figure 24B:
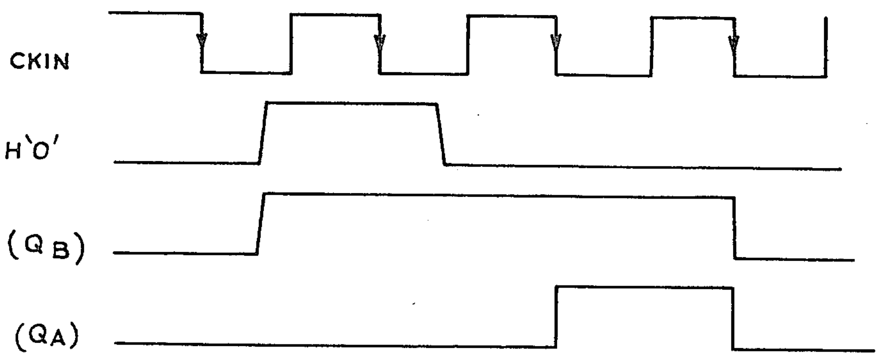

FIG. 24*b* shows a chronogram of the principal signals. The output Q of the section A (LSB less significant bit) delivers the signal CMD·STR by which the means for decoding the dynamic commands are validated. The output Q of the section B supplies a signal SDBY which indicates that the command synchronising stage SD is busy. The operation of this synchronising stage is governed by the presence of the signal GUWE which authorises a symbol or vector drawing operation.

The classification of the commands into two groups is as follows:

| | |
|---|---|
| Static commands | |
| direction of the vectors | ARG. VECT |
| short vectors | VECT.S |
| preferential direction vectors | VECT.PRV |
| vector component M | M VECT |
| vector component N | N VECT |
| quadrilateral | QUAD |
| small quadrilateral | QUAD.S |
| light pen/reticule | $\overline{\text{LPN}}$/RTL |
| erasure/$\overline{\text{background}}$ | $\overline{\text{CLR}}$/FOND |
| vector/$\overline{\text{character}}$ | VECT/$\overline{\text{CARACT}}$ |
| character word | CARACT |
| Dynamic commands | |
| trigger vector | TRG.VECT |
| trigger character | TRG.CARACT |
| light pen or reticule arming | AMR.LPEN |
| erasure or background | EFF/FOND |
| clearing of X register | CLR.X.REGIST |
| clearing of Y register | CLR.Y.REGIST |
| erasing mode | GFF/MODE |
| marking mode | MARQ/MODE |
| alight mode | ALL/MODE |
| extinguished mode | ETEINT/MODE |
| re-initialisation | $\overline{\text{RST}}$ |
| $\overline{\text{LSTR}}$ | $\overline{\text{LSTR}}$ |
| The re-initialising signal RST comprises: | |
| clearing of the control register | CLR.CNTRL.REGIST |
| clearing of the X register | CLR.X.REGIST |
| clearing of the Y register | CLR.Y.REGIST |
| clearing of the M.VECT.REGIST | CLR.M.REGIST |
| clearing of the N.VECT.REGIST | CLR.N.REGIST |
| prepositioning of the P register | PST P.REGIST |
| prepositioning Q | PST.Q.REGIST |

-continued

| | |
|---|---|
| image erasure | $\overline{RST}$ |

Figure 25A:
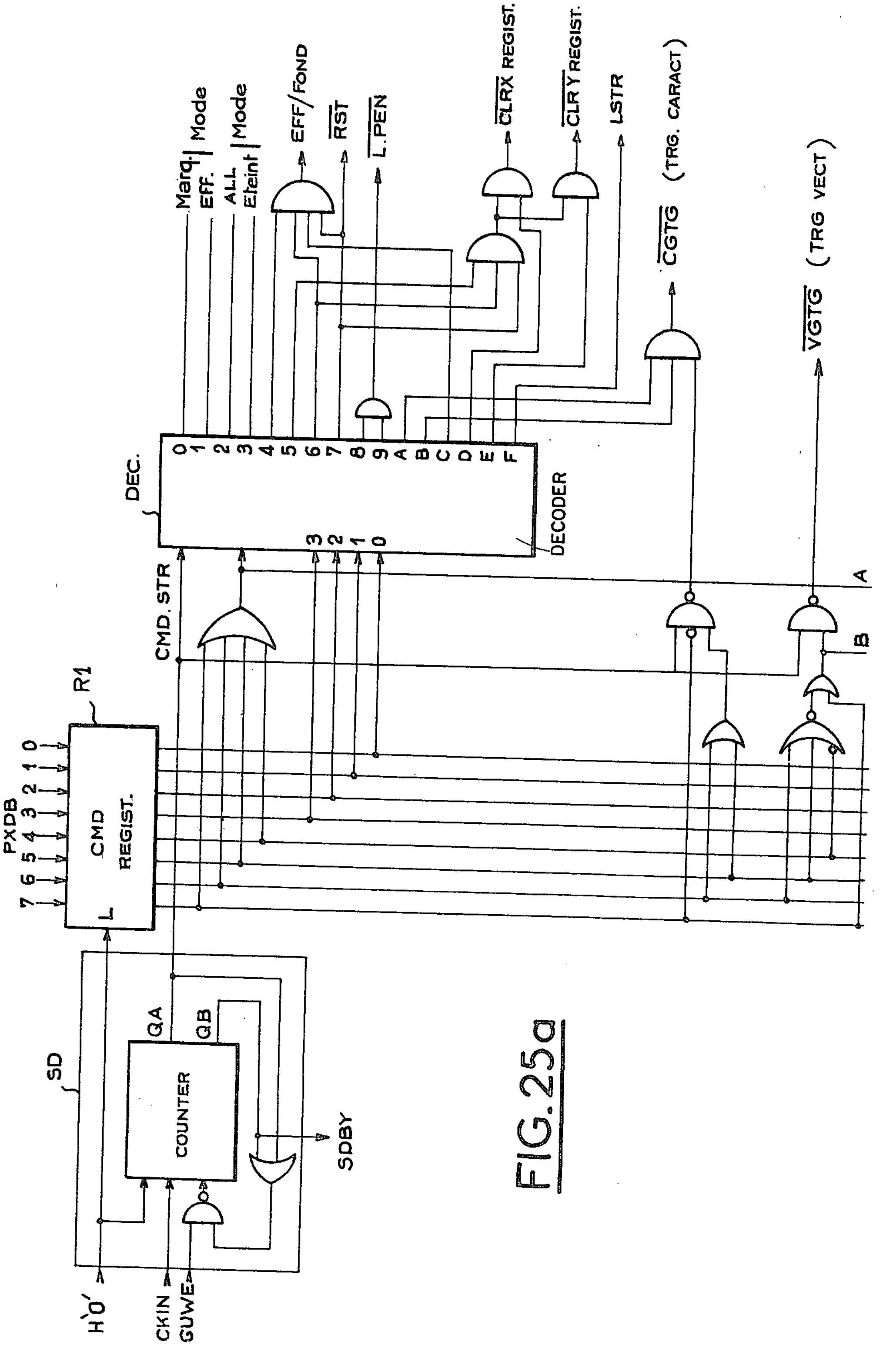
FIG. 25 shows the means for decoding the instruction words.

FIG. 25a shows the means for decoding the dynamic commands. These means comprise:

the command register CMD·REGIST which is connected to the internal data bus PXDB and which receives the address signal H'O' at its loading input L;

the circuit SD for synchronising the commands with the clock signal CKIN which delivers in particular the signal (CMD·STR) for validating the decoding circuits;

a decoding means symbolised in the form of a block DEC operating by negative logic. The outputs of this decoding block are applied to logic gates of the "AND"-type and the outputs of these gates deliver the various signals used for example to clear the register X of the writing pointer (CLR·X REGIST), to arm the light pen ($\overline{LPEN}$), to control the release of the character generator $\overline{CGTG}$, etc.

Figure 25B:
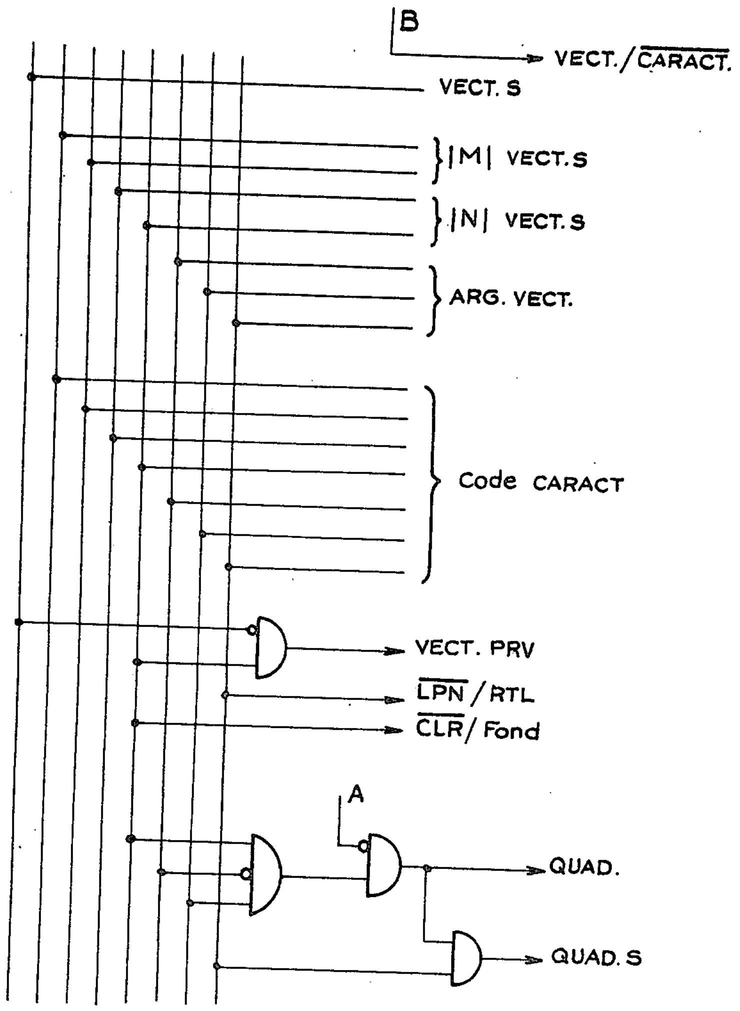

FIG. 25b shows the means for decoding the static commands, bearing in mind however that the character code-words (CODE·CARACT) are directly decoded on 7 bits by the read-only character memory situated in the symbol generator. Similarly, the codes specifying the direction of the vectors (ARG·VECT) are decoded in the vector generator.

Signal indicating "busy" of the writing generator

The writing part of the processor may be busy for four different reasons:

the vector generator VG is activated, or the symbol generator CG is activated, or the circuit for erasing or recording a background is activated, the circuit for synchronising the commands is activated.

Synchronisation of the commands is activated for one of the first three reasons. It begins by the presence of a signal at the address H'O' which results in arming the circuit SD for synchronising the commands.

The execution of a command of "short duration", for example clearing of the X register of the writing pointer, leads to a short busy period because it is limited to the synchronising time of the synchronising circuit.

Figure 26:
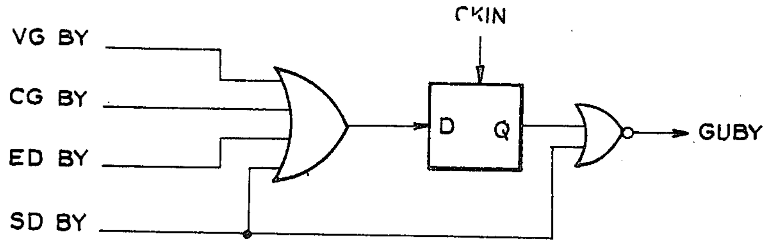
FIG. 26 shows one embodiment of the means for producing the signal indicating busy state of the graphic generator.

FIG. 26 shows the means for producing a "free busy" signal. This means comprises a logic gate of the "OR" type having four inputs: a first input receives the signal VGBY (vector generator busy), a second input receives the signal CGBY (symbol generator busy), a third input receives the signal EDBY (erasing circuit busy) and a fourth input receives the signal SDBY (command synchronising circuit busy). The first three signals may comprise possible spurious signals and are centred between two falling edges of the clock signal CKIN. To eliminate these spurious signals, a D-type flip-flop is provided at the output of the gate. Conversely, the signal SDBY does not comprise any spurious signals, although the beginning of this signal does not coincide with a falling edge of the clock signal CKIN. The output of the flip-flop and the signal SDBY are applied to the inputs of a logic gate of the "NOR"-type to supply a "free/busy" signal.

Control register

Figure 27:
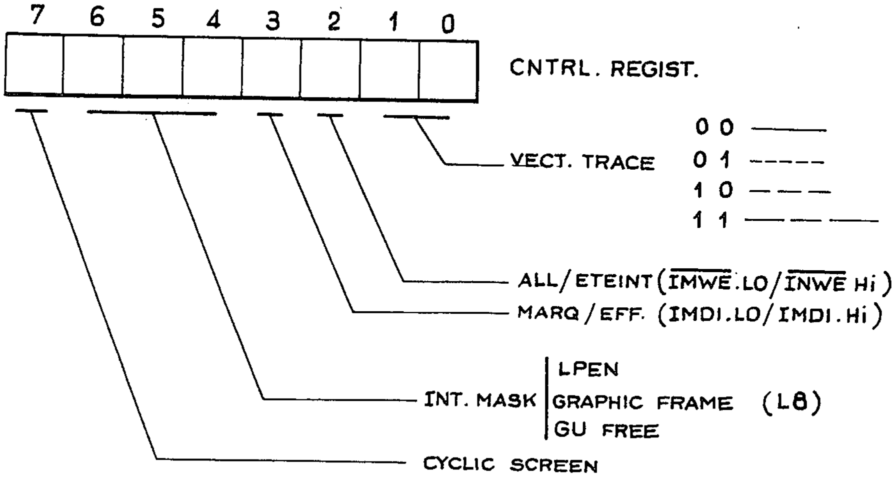
FIG. 27 shows the format of the control word.

The control register (CNTRL·REGIST) is an 8-bit register of the "latch" type. It is accessible in the reading mode and the writing mode by the address word H'1' on the internal two-way data bus PXDB. The format of the control word is shown in FIG. 27. This control word enables:

(a) the nature of the lines (continuous or interrupted) to be specified on the bits 0 and 1 (VECT·TRACE), (b) the command signal $\overline{IMWE}$ of the image memory IM to be controlled on bit 2, (c) the command signal IDIN of the image memory IM to be controlled on bit 3, (d) the control word on bits 4, 5 and 6 supplies the interruption masks (INT·MASK), (e) on bit 7, it enables the size of the addressable space (CYCLIC SCREEN) to be controlled.

Figure 28:
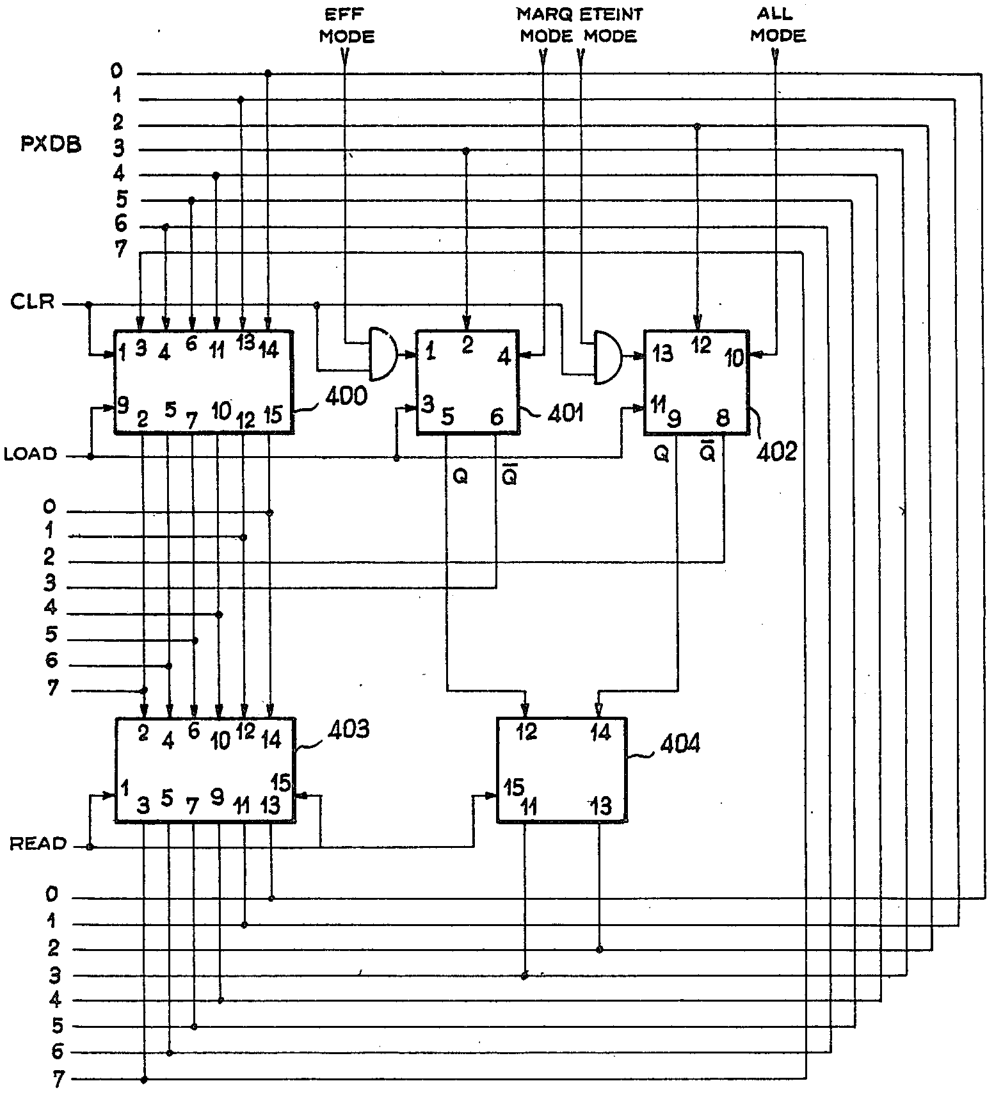
FIG. 28 shows the electrical diagram of the control register.

FIG. 28 shows the circuit diagram of the control register and the associated reading means. In the interests of simplicity, the constituent elements of the control register are standard MSI components, the element 400 is an OS/174 module and the elements 401 and 402 are produced from an LS/74 module. Similarly, the elements 403 and 404 are produced from DM 8097 modules. The command signals of the control register are as follows:

the signal LOAD is the command signal for loading the control word, the signal CLR is the command signal for clearing the register, the signal READ is the command signal for reading the control word.

Interruption circuits

The interruption circuits enables the interruption signals to be produced. These circuits have to be tested by the control unit MPU before any command is issued so as not to interfere with the execution of an operation in progress.

Three signals internal to the processor may produce an interruption:

the graphic unit is free, signal L8 (graphic image frame),

"light pen" operation terminated.

Figure 29A:
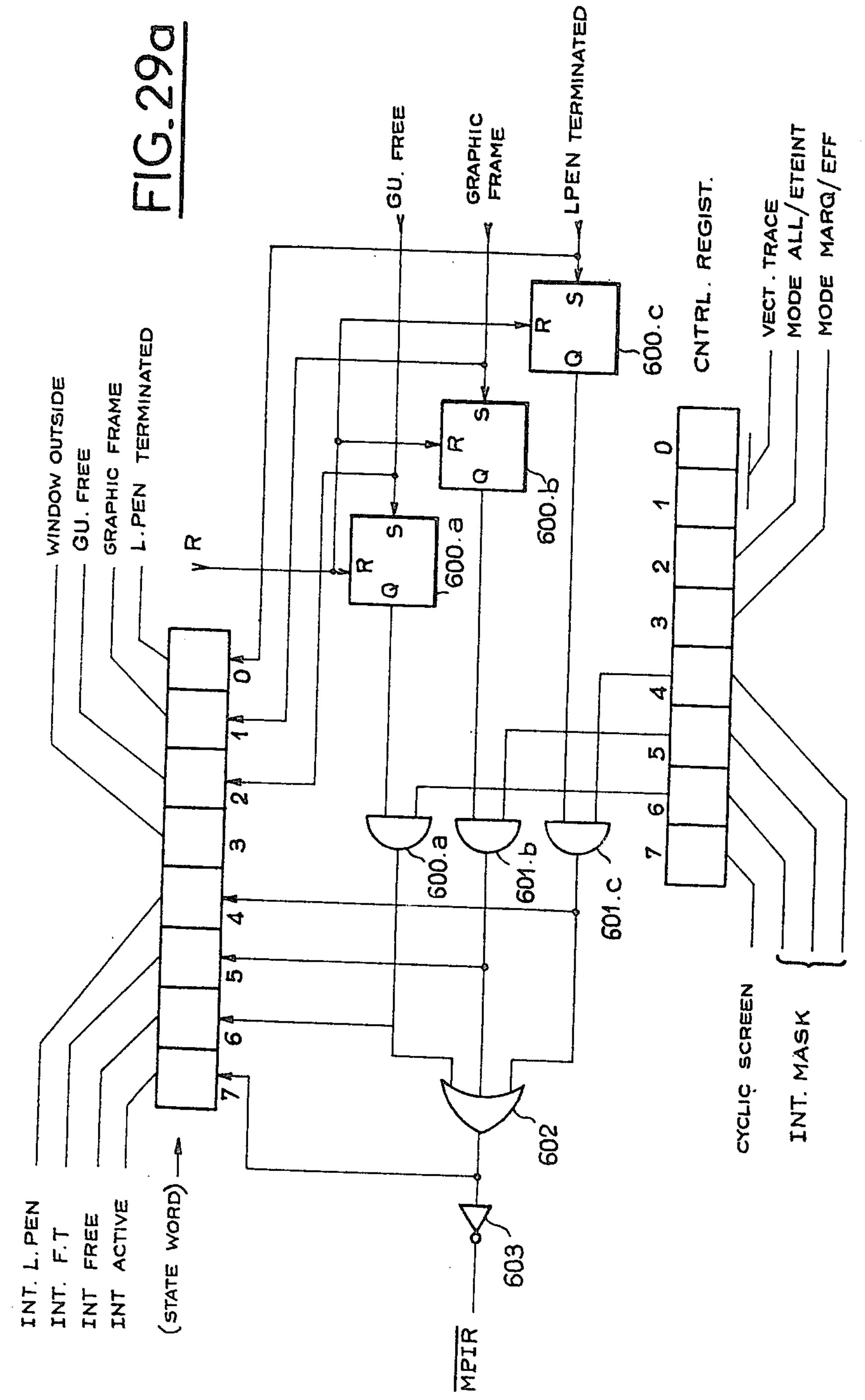
FIGS. 29*a* and 29*b* are a functional diagram of the interrupt means.

FIG. 29a is a functional diagram of the interruption element. It comprises three flip-flop circuits 600.*a*, 600.*b* and 600.*c* of which the inputs are respectively connected to the three preceding signals. The output of one flip-flop circuit passes to the high level in the event of a transition for the corresponding reason. The output of these flip-flop circuits is masked by means of logic gates 601.*a*, 601.*b* and 601.*c* of the "AND" type through bits 4, 5 and 6 accessible in the control register CNTRL·REGIST.

On the one hand, the outputs of these logic gates fix the state of bits 4, 5 and 6 of the state word and, on the other hand, are applied to a logic gate 602 of the "OR"-type. On the one hand, the output of this "OR"-gate fixes the state of bit 7 of the control word and, on the other hand, is complemented by an operator 603 of the I-type of which the output is an open collector to form the exchange signal $\overline{MPIR}$ (microprocessor interrupt request). The inputs of the flip-flop circuits 600 are accessible to the bits 0, 1 and 2 of the state word.

A signal for reading the state word applied to the input R resets the output of the flip-flop circuits to the high level which enables an interruption to be suppressed without eliminating its cause and without having masked it, for example if it is desired to await the following interruption of like nature. However, during the reading of the state word, the resetting of the flip-flop circuits to the low level must not take place systematically, which could result in the "loss" of an interruption. In this case, it is necessary firstly to sample the output of the flip-flop circuit and then to reposition it to the low level in dependence upon the result of this sampling.

Figure 29B:
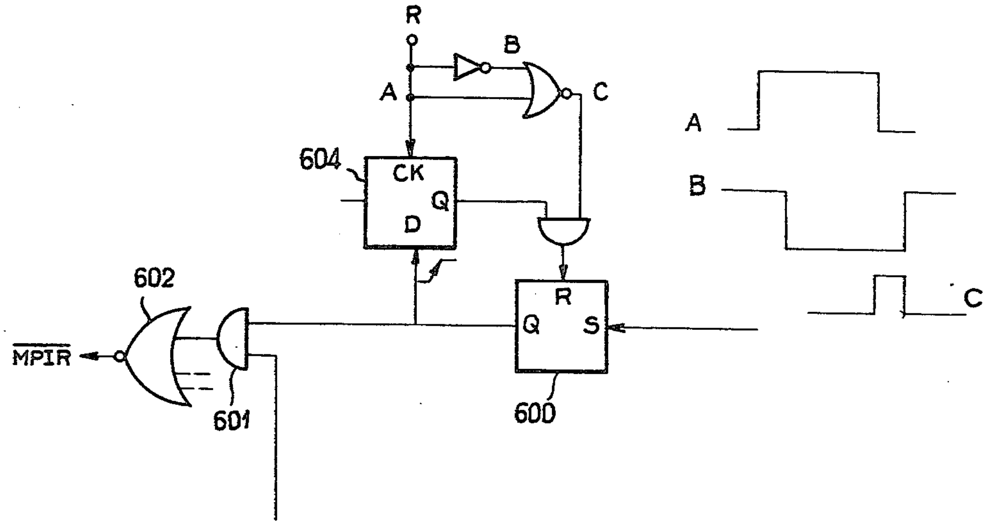

This conditional clearing may be effected by the circuit arrangement shown in FIG. 29*b* in which a flip-flop circuit 604 of the D-type enables the output of the flip-flop circuit 600 to be sampled by means of the signal for reading a state word applied to the input R.

Finally, bit 3 of the state word indicates whether a point in the course of being drawn by the graphic unit is situated outside the designated window.

Photosensitive pen

The photosensitive pen or light pen is an optical graphic interaction pointer. It enables entities displayed on the screen to be designated or graphic data to be directly introduced. The light pen is a device known in the art and will not be described.

Figure 30:
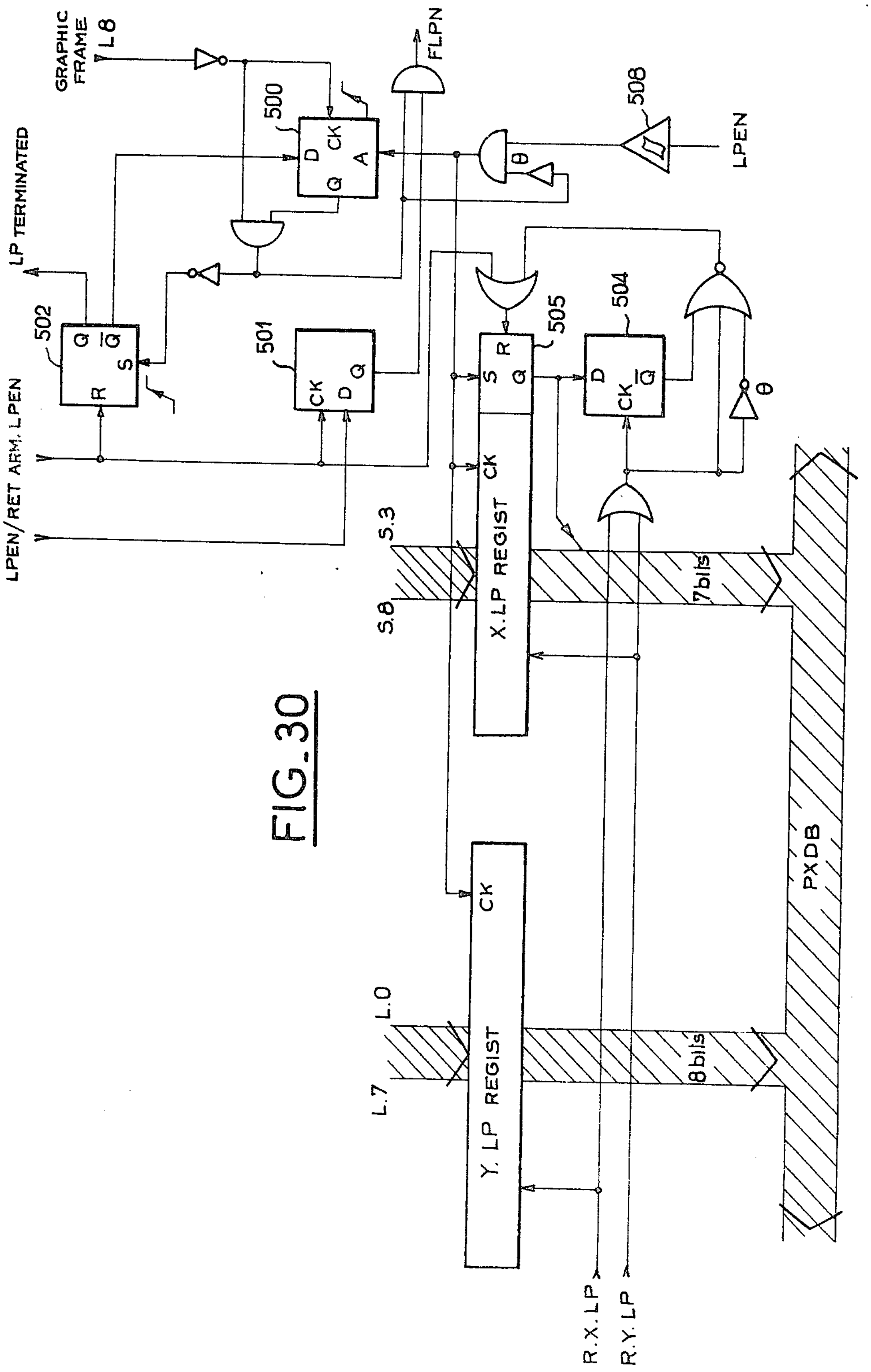
FIG. 30 is an electrical diagram of the circuits of the light pen.

FIG. 30 is a block diagram showing the circuits of the light pen (LPEN circuits). They provide for access to the address (X and Y) of a point of the image memory.

These circuits comprise in particular two registers: a register X L·P REGIST of which the content is the address along a line of the graphic image, only the 6 most significant bits being significant, and a register YL·P REGIST of which the content is the address along a row of the graphic image represented on an octet. In the case where the input FMAT is at the high level 512×512 dots, the content of the registers should if necessary be multiplied by a factor of 2 if it is desired to obtain the real logic address. It is necessary to take into account the possible delays introduced between the output of the addresses IMBA and the output of the signal LPEN by the elements external to the processor and to subtract from the register X·L·P a quantity corresponding to the address effectively read. The inputs of the registers X·L·P and Y·L·P are connected to the reading addresses supplied by the control unit, whilst their outputs are connected to the internal bus PXDB. Accordingly, these registers are accessible solely in the reading mode.

The circuits of the light pen receive a command signal "ARM LPEN" resulting from the command word H'08', the signal L·8 (graphic frame), the pen/reticule command signal (LPEN/RTL) and the output signal (LPEN) of the light pen. These circuits deliver a signal F·LPEN for forcing the video-signal to the "white" level and an "LP terminated" signal which indicates whether the contents of the registers X·L·P and Y·L·P have been read.

In addition to the registers X·L·P and Y·L·P, the circuits of the light pen comprise logic sequencing means comprising: a flip-flop circuit 500 of the D-type, a flip-flop circuit 501 of the D-type, a bistable flip-flop 502, a threshold circuit 503 and various logic connecting gates. The elements denoted by the reference $\theta$ introduce time delays into the connections. The registers X·L·P and Y·L·P are registers of the "latch" type (locked), of which the three-state outputs are connected to the internal bus PXDB. The flip-flop circuit 505 which is reset to zero by the reading signal of the registers X·L·P and Y·L·P has to be associated with a flip-flop circuit 504 for the same reason as the interruption flip-flop.

When the circuits LPEN receive a command signal "ARMLPEN" code H'08 or "ARM RTL" H'09', it is necessary during the following frame to await a rising edge of the signal LPEN which is used for sampling the current value of the display address in the two registers. Where a light pen is used, the video output signal of the image memory is forced to the "white" level by the signal $\overline{\text{IMFB}}$ during the frame in question. Where a reticule is used, the "lines" on the image have to be produced outside the module of the processor. The logic "OR" of the two "vertical line" and "horizontal line" elements has to be applied to the input pin LPEN.

The output signal "LPEN not read" of the trigger circuit 505 is accessible on the less significant bit of the register X.L.P. The output signal "LP terminated" is accessible in the state word and may be the origin of an interruption.

The command signals enabling the content of the registers to be read are the signal R·XLP for the address code H'B' and the signal R·YLP for the address code H'C'.

Erasing/continuous base means

The processor comprises an erasing means enabling the entire graphic image or, in equivalent terms, the content of the image memory unit to be erased. This erasing means is also used when it is desired to record a background different from "black" on the display screen. This "erasing/continuous base" means operates during the reading/display mode of the processor and is activated by the command words H'04' and H'0C' which respectively correspond to the "erasing" and "background" functions. The release of an erasing/base operation forces the signal $\overline{\text{IMWE}}$ to the low level and the signal IMDI to the high level in the case of an "erasing" order and to the level of bit 3 of the control register in the case of a "background" order. The action of these code words is independent of bits 2 and 3 of the control register CNTRL·REGIST and does not modify either bit 2 or bit 3. The time required for carrying out an erasing/background operation is equal to the duration of a TV frame when the input FMAT is at the low level (paired frames) and to the duration of two frames when the signal FMAT is at the high level (interlaced frames).

Figure 31A:
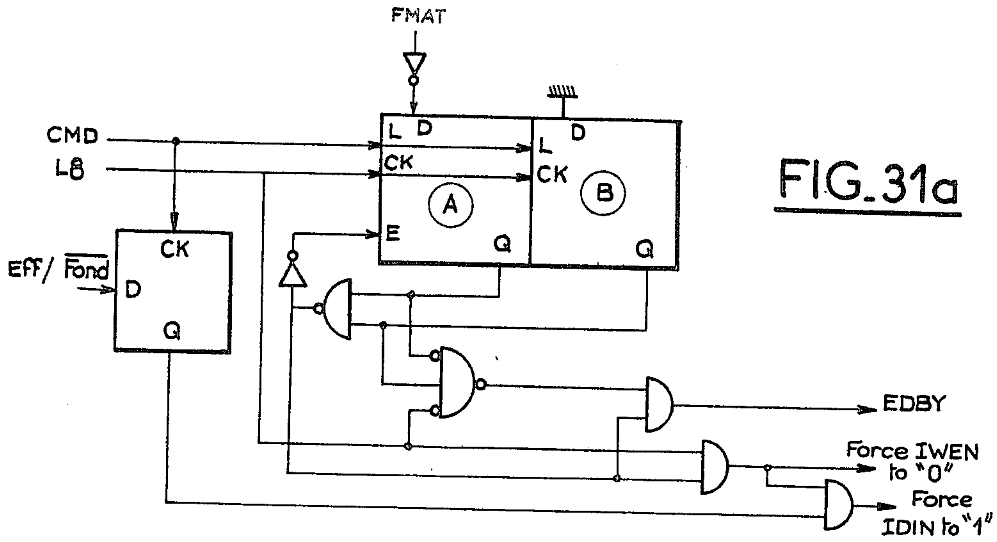
FIGS. 31*a* and 31*b* show in a functional form the means for erasing and recording a base.

FIG. 31*a* shows one embodiment of the means for erasing and recording a continuous base. It will be recalled that:

the output IMDI (input data of the image memory) is at the high level for recording an erased point, the output $\overline{\text{IMWE}}$ (validation of a writing operation in the image memory) is at the low level for a writing operation.

Figure 31B:
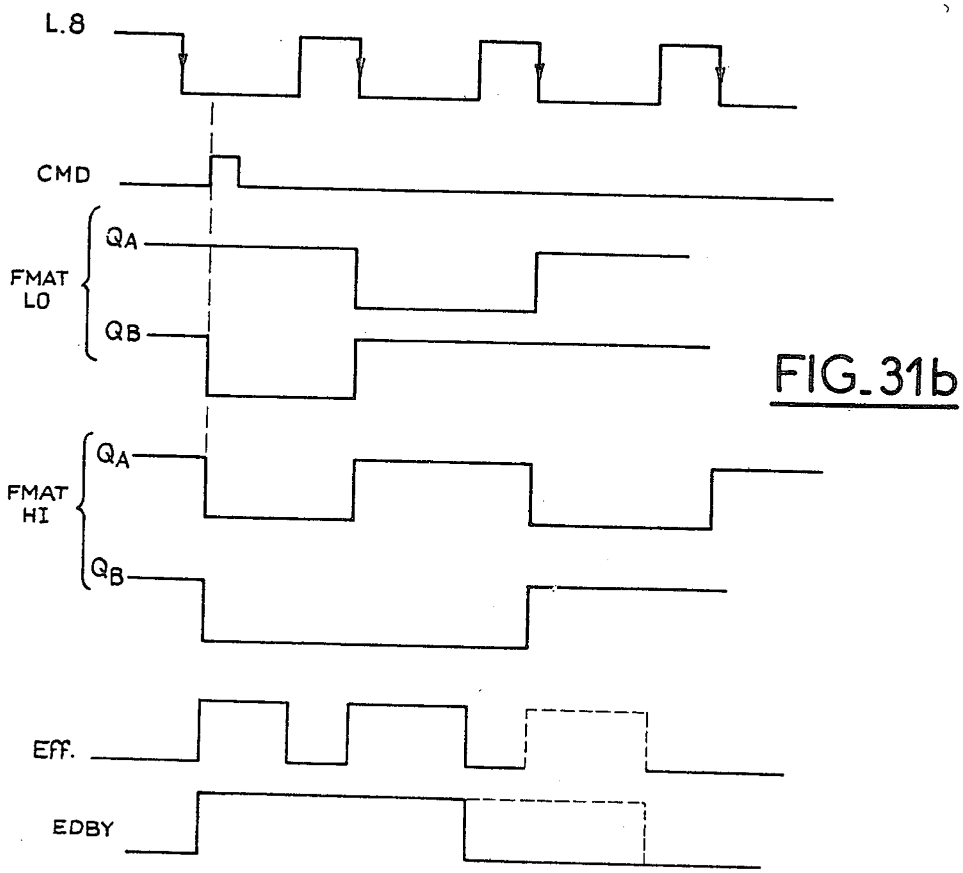

The erasing means is formed by a two-bit counter; the section A corresponds to the less significant bit (LSB) whilst the section B corresponds to the most significant bit (MSB). The section A may be initialised with the value of the signal FMAT complemented by an element of the inverter type, whilst the section B may be initialised at the low level. The "erasing command" signal asynchronously loads this counter to the state "01" if the signal FMAT is at the low level and to the state "02" if the signal FMAT is at the high level. FIG. 31*b* is a chronogram of the principal signals associated with the erasing means. The erasing means remains active as long as the state of the counter is different from the state "11". The counter runs on the falling edge of the "graphic image frame" signal (output L.8 of the vertical counter of the control unit). A trigger circuit of the D-type records whether the operation in question is an erasing operation or an operation for recording a background. The erasing device ED supplies a signal EDBY (erasing/base device occupied) when the section A is at the low level and the section B at the high level, except for the periods of time during which the signal L.8 is at the high level.

The device also supplies a signal for forcing the signal $\overline{IMWE}$ to the low level and a signal for forcing the signal IMDI to the level "1" for an erasing operation. If the memory modules of the image memory are arranged to operate in the "read-modify-write" mode during the periods where the processor operates in the reading-/display mode, the frame(s) will be displayed, enabling the animated drawing to be made at a maximal speed by writing the new drawing when the signal L.8 (graphic image frame) is at the high level and by triggering the erasing operation prior to the beginning of the frame signal.

Signal IDIN

Figure 32:
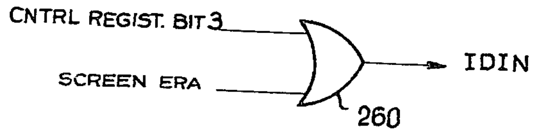
FIG. 32 shows one embodiment of the means for producing the signal IDIN.

The means for producing the signal IDIN is shown in FIG. 32. It is formed by a logic gate 260 of the "OR" type having two inputs, namely a first input which receives the signal available on bit 3 of the control register (CNTRL REGIST) and a second input which receives a signal generated by the device for erasing the CRT screen or, more precisely, the content of the image memory IM.

Signal $\overline{IMWE}$

Figure 33:
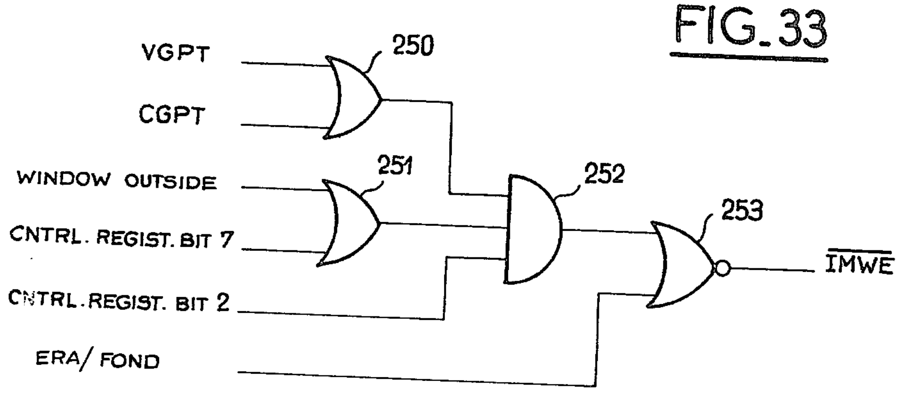
FIG. 33 shows one embodiment of the means for producing the signal IWEN.

The means for producing the signal $\overline{IMWE}$ which at the low level enables a writing operation in the image memory is shown in FIG. 33. The signal $\overline{IMWE}$ is at the low level when the output signal CGPT of the symbol generator is at the high level or when the output signal VGPT of the vector generator is at the high level. Depending on whether bit 2 of the control word is at the high level and whether the content of the writing pointer is below the space visible on the CRT screen, the signal $\overline{IMWE}$ may be forced to the low level during an operation for erasing the screen or for recording a background on the screen. The means for producing the signal IWEN comprise: a logic gate 250 of the "OR"-type which receives the signals VGPT and CGPT at its inputs; a logic gate 251 of the "OR"-type which at its inputs receives the overflow signal of the writing pointer and the signal corresponding to bit 7 of the control word; a logic gate 252 of the "AND"-type having three inputs which receives the output signal of the gate 250, the output signal of the gate 251 and the signal corresponding to bit 2 of the control word. The output of the gate 252 is applied to one of the two inputs of a logic gate 253 of the "NOR"-type which, at its other input, receives a signal corresponding to an erasing operation or a background displaying operation.

Signals $\overline{IMFB}$ and IMFN

Figure 34:
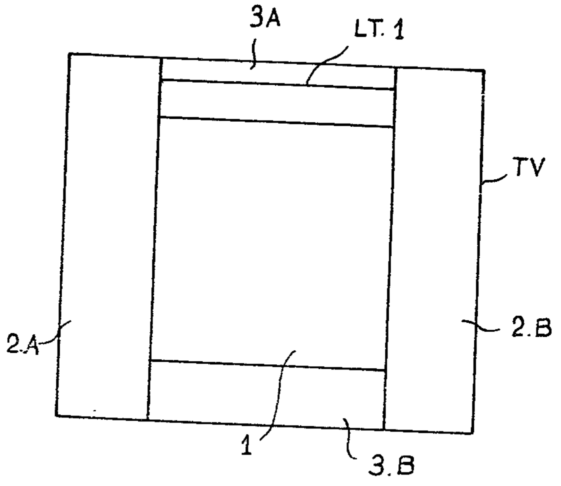
FIG. 34 shows the various zones of the cathode screen.

FIG. 34 shows the various zones of the CRT screen:

the TV frame delimits the TV image resulting from the TV scan of the CRT screen, the zone 1 corresponds to the graphic image, the zones 2A and 2B respectively represent the left-hand and right-hand margins of the graphic image, the zones 3A and 3B respectively represent the top margin and bottom margin of the graphic image.

The function of the signals $\overline{IMFB}$ and IMFN is to force the video signal into a predetermined "black" or "white" state. The signal IMFN which forces the luminance level of the CRT screen to "black" enables the zones outside the graphic image to be blanked because spurious signals emanating from the writing or refreshing operation in the image memory can be produced in these zones. At the beginning of each frame, in the blanked-off part of the TV screen, the signal $\overline{IMFB}$ enables the luminance to be forced to the "white" level during a line known as the test line LT.1 in the 625 F TV standards. It also enables the luminance level to be forced to the white level when a light pen is used.

Figure 35:
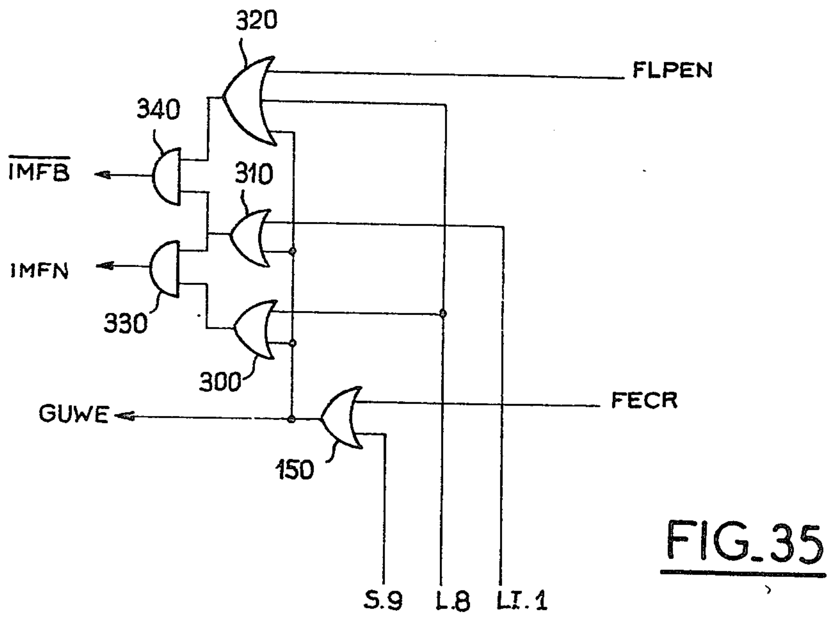
FIG. 35 shows one embodiment of the means for producing the signals $\overline{\text{IMFB}}$ and IMFN.

FIG. 35 diagrammatically illustrates one embodiment of the means for producing the signals $\overline{IMFB}$ and IMFN. These means comprise:

three logic gates of the "OR"-type which receive the signal GUWE described above, and two logic gates of the "AND"-type.

In addition to the signal GUWE, the gate 300 receives the signal L.8 (graphic frame) corresponding to the most significant output of the vertical reading/display counter. In addition to the signal GUWE, the gate 310 receives the signal LT.1 corresponding to the test line of the "white" level delivered by the vertical reading/display counter. In addition to the signal GUWE, the gate 320 receives the signal L.8 and a forcing signal FLPEN supplied by the means for reading the address of the light pen. The output signals of the gates 300 and 310 are applied to the inputs of the gate 330 which delivers the signal IMFN at its output, whilst the output signals of the gates 310 and 320 are applied to the inputs of the gate 340 which delivers the signal $\overline{IMFB}$ at its output.

The signal LT1 occurs during a period of forcing to the "black" level. It is easier to effect a forcing operation to the "black" level with priority over forcing to the "white" level. For this reason, the signal IMFN passes to the low level during this line LT.1. Under these conditions, the forcing operations to the "white" level and to the "black" level are always exclusive.

Signal $\overline{ISTR}$

The signal $\overline{ISTR}$ results from the decoding of the address word H'A'. In fact, this signal is a counterpart of the exchange signal $\overline{MPCE}$ and is not dependent upon the signal MPR/$\overline{W}$.

The signal $\overline{ISTR}$ commands a register external to the processor. It may be used either solely in the reading mode or solely in the writing mode or in both the reading mode and the writing mode.

Figure 36:
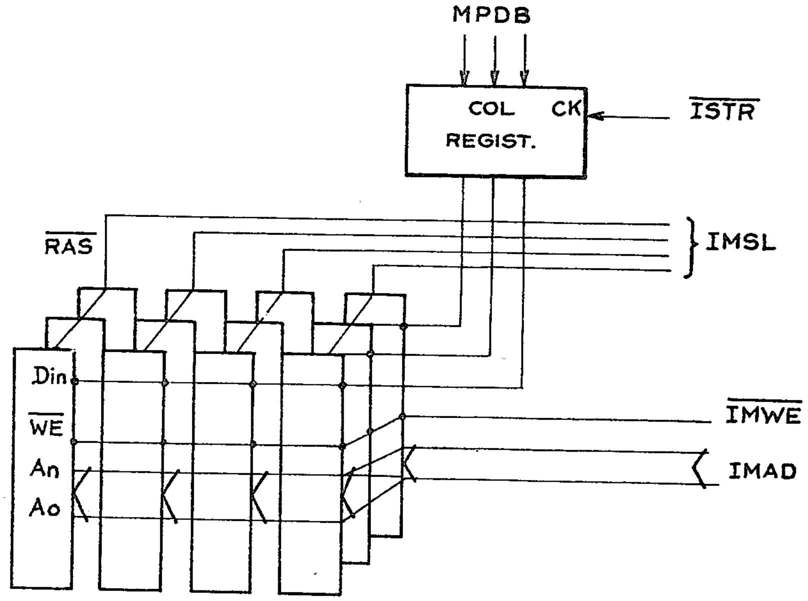
FIG. 36 is a diagram showing the application of the signal $\overline{\text{ISTR}}$ in the writing mode.

FIG. 36 illustrates the use of the signal $\overline{ISTR}$ in the writing mode for sampling a "colour" register in a three-colour (red, green, blue) (256×256) dot application enabling 8 different colours to be obtained. The inputs of the colour register (COL.REGIST) are connected to the data bus MPDB of the microprocessor. It is sampled at its input CK by the signal $\overline{ISTR}$. The image memory is composed of three sections of four memory modules of 16 K by 1 bit.

Figure 37:
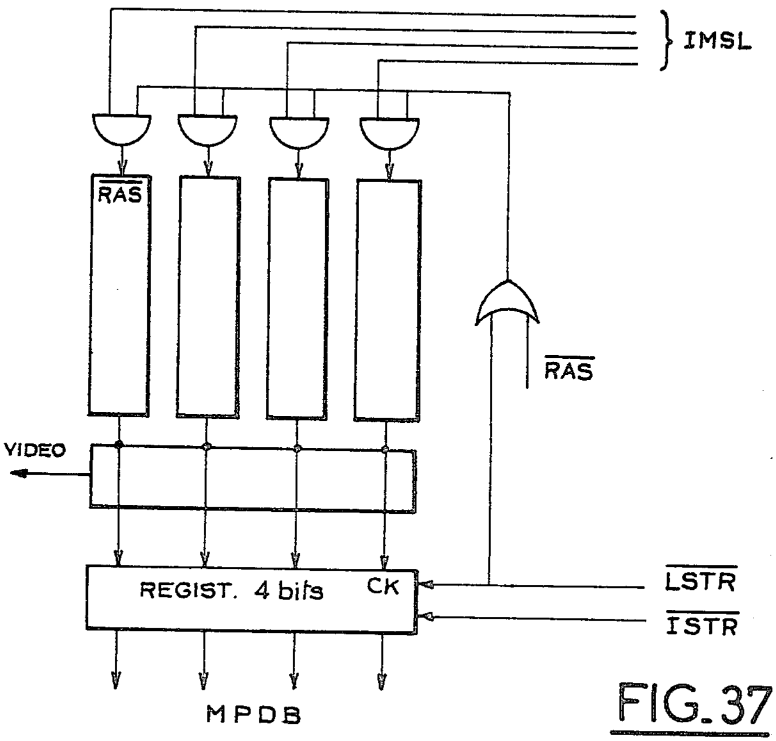
FIG. 37 is a diagram showing the application of the signal $\overline{\text{ISTR}}$ in the reading mode.

FIG. 37 illustrates the use of the signal $\overline{ISTR}$ in the reading mode for positioning the value on the bus MPDB of the microprocessor after the use of the signal $\overline{LFTR}$. It is understood that the programmer only uses this signal $\overline{ISTR}$ of address H'A' in the reading mode because it is possible by monitoring the "free" signal (bits 2 and 6 of the state word) when reading was effected.

Signal $\overline{LSTR}$

The signal $\overline{LSTR}$ results from the decoding of the command word H'OF'. It releases a reading operation at the point addressed by the X and Y registers of the writing pointer. During this reading operation, the output of the image memory may be sampled in a register accessible externally by the control unit MPU. In this way, the programmer is able to operate point-by-point in the image memory. Depending on the organisation of the memory, it is possible to collect a complete word (of which the length depends on the organisation of the image memory) if the signal $\overline{LSTR}$ forces the signal GUWE or a single point where the selection outputs IMSL are used.

Figure 38:
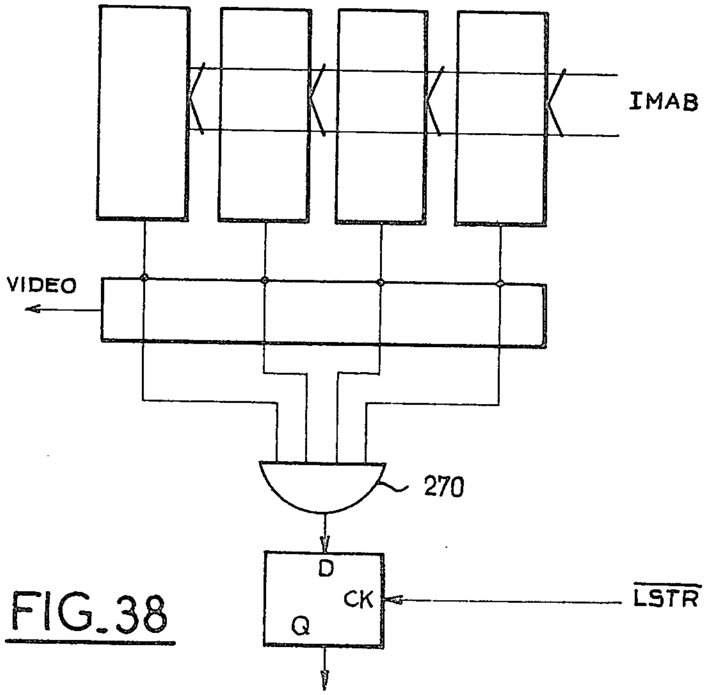
FIG. 38 is a diagram showing the application of the signal $\overline{\text{LSTR}}$.

FIG. 38 shows one example of application of the signal $\overline{LSTR}$ in the case of a graphic image of (256×256) binary dots (monochrome). The image memory is made up of 4 memory modules of 16 K by 1 bit of which the output is high when they are not selected. The outputs of the memory modules are applied to the input of a logic gate 270 of the "AND"-type of which the output is sampled by a D-type flip-flop circuit which receives the reading command signal LSTR at its input CK.

To conclude this description, one embodiment of the processor on a microchip of a semiconductor substrate is described purely by way of example in the following. The implantation of the circuits is dictated on the one hand by the reduction in the length of the connections and, on the other hand, by the need to finish up with a microchip substantially square in shape.

Figure 39:
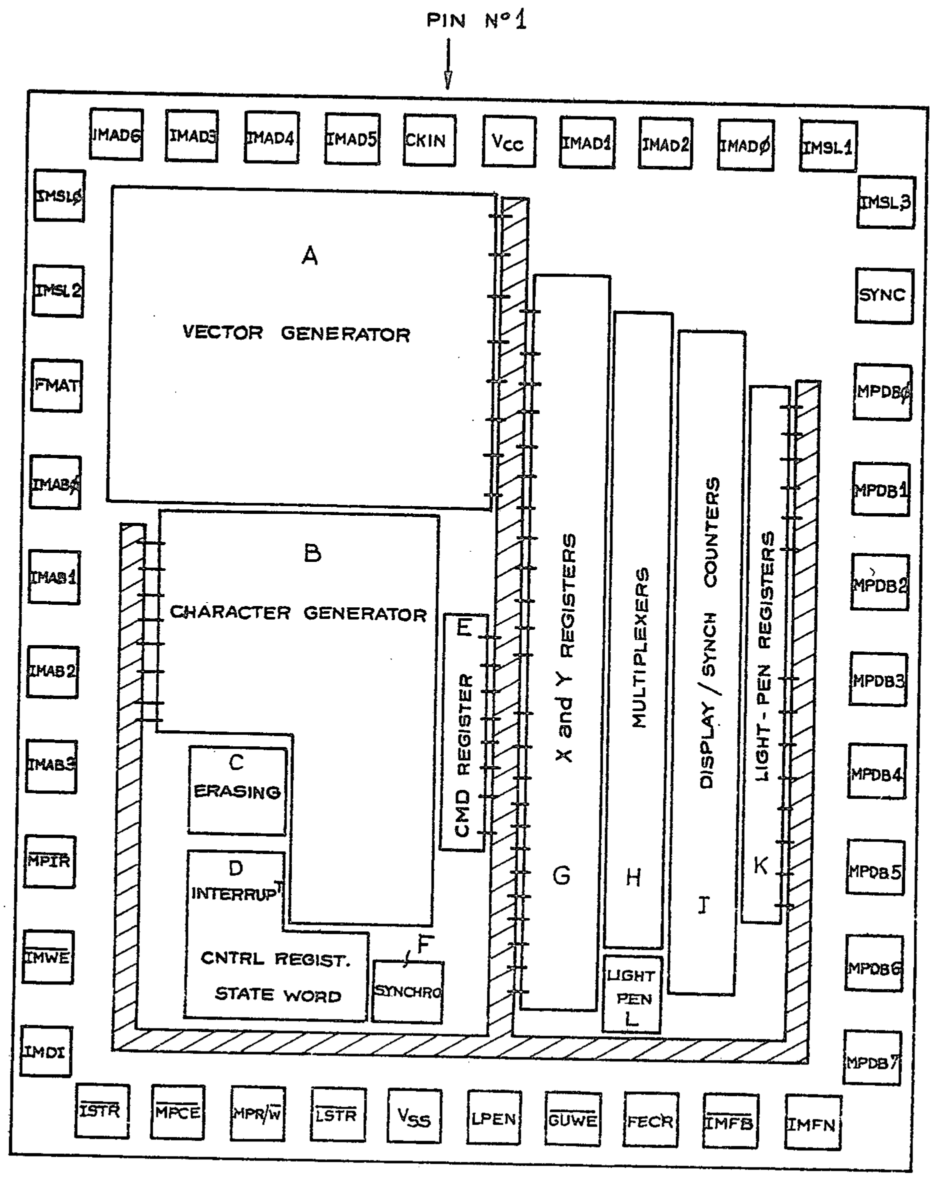
FIG. 39 illustrates one method of implanting the processor on a microchip of a semi-conductor substrate.

FIG. 39 shows one possible method of implantation:

the inputs/outputs are indicated on the periphery of the pellet, the internal U-shaped bus partly governs the distribution of the various blocks, block A represents the vector generator, block B represents the symbol generator, block C represents the erasing circuit, block D represents the interruption circuit, the control register and the state word, block E represents the command register, block F represents the synchronising circuit, block G represents the X and Y registers of the writing pointer, block H represents the multiplexers, block I represents the control unit, block K represents the X and Y registers for reading the light pen, block L controls the signals for the light pen.

This distribution of the blocks makes it possible in particular to minimise the paths of the bus and facilitates the connections of the blocks to the inputs/outputs of the pellet.

A processor of the type described above comprises of the order of 6000 individual transistors which may be implanted on a microchip of approximately 22 mm$^2$.

I claim:

1. A digital MOS processor connected on to a command unit and to a TV set enabling: in a writing mode, the data of a graphic image to be produced and stored in an external memory unit and, in a reading mode, these stored data to be read and displayed on the CRT screen of the TV set; characterised in that, on a single microchip of a semi-conductor substrate, it comprises:

a two-way data bus comprising input/output means and terminals enabling it to be connected to the command unit;

an address bus comprising means enabling it to be connected to the command unit;

terminals carrying signals allowing dialogue with the command unit;

a control unit which produces signals enabling the time bases of the TV set to be synchronized, address signals enabling the data stored in the memory unit to be read, signals for controlling the luminance levels of the CRT screen of the TV set and internal timing signals; this control unit being connected to an external clock circuit comprising a dot clock and a dividing counter which supplies addressing signals to the memory unit;

a graphic unit comprising a symbol generator and a vector generator coupled to a writing pointer which supplies write address signals to the memory unit;

a register connected to the data bus and to the address bus and enabling command words to be stored;

a plurality of registers connected to the command bus and to the address bus and enabling data words to be stored;

a first multiplexer connected to the control unit and to the graphic unit and enabling the reading and writing address signals of the memory unit to be multiplexed in dependence upon the mode of operation (reading or writing) of the processor;

a second multiplexer connected to the first multiplexer and enabling the low part and the high part of the writing addresses and reading addresses to be multiplexed at the rate of the internal clock signal;

a third multiplexer connected to the control unit and to the graphic unit and enabling certain of the reading and writing address signals to be connected according to the format of the TV image;

a reading means connected to the control unit and enabling a dot of the graphic image displayed on the CRT screen of the TV set to be read; this reading means comprising a register connected to the data bus which enables the data of the address of the displayed dot to be stored, a means for forcing the graphic image to the "white" level, a means for reading the content of the register and a means for indicating the busy state of this reading means;

an interruption element comprising a means for producing a word indicating the state of the graphic unit, a masking means controlled by masking bits contained in the control register, a means for recording the state word connected to the data bus and to the address bus and comprising means for reading this recording means, synchronizing means for synchronizing a means for decoding the command words stored in the command register, an erasing means enabling the data of the graphic image stored in the memory unit to be erased or a continuous background to be stored in the memory unit, the control unit comprising means enabling the format (interlaced frames or paired frames) of the TV image to be modified.

2. A processor as claimed in claim 1, characterised in that the control unit comprises two counters: a horizontal counter coupled to a state recognition circuit of which the output signal resets this counter to the zero state at the beginning of a line of the graphic image and a vertical counter coupled to a state recognition circuit of which the output signal resets this counter at the beginning of a frame of the graphic image.

3. A processor as claimed in claim 2, characterised in that the most significant bits signal of the horizontal counter controls the mode of operation (reading mode or writing mode) of the processor.

4. A processor as claimed in claim 3, characterised in that the most significant bits signal of the horizontal counter is delivered to a means enabling the processor to be forced into the writing mode.

5. A processor as claimed in claim 1, characterised in that the writing pointer is formed by two synchronous up/down registers comprising means for loading the means for indicating the overflow, means for clearing the content, means for reading the content and means for controlling the counting direction.

6. A processor as claimed in claim 5, characterised in that the means for controlling the counting direction of the writing pointer comprise a multiplexer controlled by the graphic unit.

7. A processor as claimed in claim 1, characterised in that the control register is accessible for reading and for writing.

8. A processor as claimed in claim 1, characterised in that the symbol generator comprises two registers for storing digital data which specify the scale factors of the displayed symbols.

9. A processor as claimed in claim 8, characterised in that the two registers for storing the scale factors are accessible for reading and for writing.

10. A processor as claimed in claim 1, characterised in that the external memory unit is organized into words for the reading mode.

11. A processor as claimed in claim 10, characterised in that the organisation of the external memory unit enables the definition of the displayed graphic image to be modified.

12. A processor as claimed in claim 1, characterised in that the dot clock of the external clock circuit is an oscillator of which the frequency may be electronically modified.

13. A processor as claimed in claim 1, characterised in that the frequency of the dot clock is modified in accordance with the format of the TV image.

14. A processor as claimed in claim 1, characterised in that the command register has a word enabling an external register to be controlled.

15. A processor as claimed in claim 1, characterised in that the dialogue signals enable an external register to be controlled.

* * * * *